(12) United States Patent
Feced et al.

(10) Patent No.: US 6,445,852 B1
(45) Date of Patent: Sep. 3, 2002

(54) OPTICAL FIBER GRATING

(75) Inventors: Ricardo Feced, Alicante (ES); Michael Nickolaos Zervas, Southampton; Michael Kevan Durkin, Worcestershire, both of (GB)

(73) Assignee: University of Southampton, Southampton (GB)

(*) Notice: Subject to any disclaimer, the term of this patent is extended or adjusted under 35 U.S.C. 154(b) by 79 days.

(21) Appl. No.: 09/629,651

(22) Filed: Aug. 1, 2000

(51) Int. Cl.[7] ................................................. G02B 6/34
(52) U.S. Cl. ......................................................... 385/37
(58) Field of Search ............................ 385/37; 359/569, 359/575

(56) References Cited

U.S. PATENT DOCUMENTS

| | | | | |
|---|---|---|---|---|
| 5,216,739 A | * | 6/1993 | Hill et al. | 359/566 |
| 5,887,094 A | * | 3/1999 | Bakhti et al. | 385/27 |
| 6,035,083 A | * | 3/2000 | Brennan et al. | 359/569 |
| 6,050,109 A | * | 4/2000 | Kosinski et al. | 65/111 |
| 6,304,696 B1 | * | 10/2001 | Patterson et al. | 359/130 |

* cited by examiner

Primary Examiner—John D. Lee
Assistant Examiner—Scott A Knauss
(74) Attorney, Agent, or Firm—John S. Reid; Reidlaw, L.L.C.

(57) ABSTRACT

Methods and apparatus for creating a Bragg grating in an optical waveguide having an optical fiber on which the Bragg grating is defined, the Bragg grating having an actual response which closely approximates a desired response. The Bragg grating comprises a plurality of lines, each line being defined by a respective strength, and each line having a relative displacement from adjacent lines. The Bragg grating is designed using a serial iterative response. The serial iterative process can be used to calculate the strength and the line spacing of at least some of the lines. The serial iterative process can further be a function of a coupling function, which is a function of the strength and line spacing of the lines of the grating. A moving window can be used to limit the number of reflections in the impulse response which is used to calculate the next serial line spacing. The serial iterative process can further be a function of the group velocity of light in the optical fiber, the reflectivity of the grating, and the dispersion response of the grating.

23 Claims, 22 Drawing Sheets

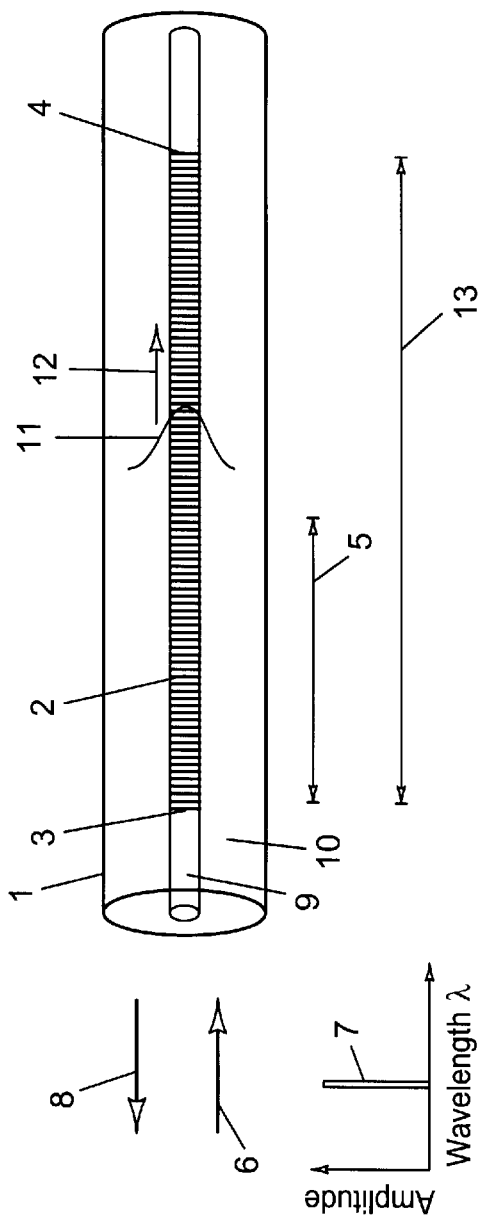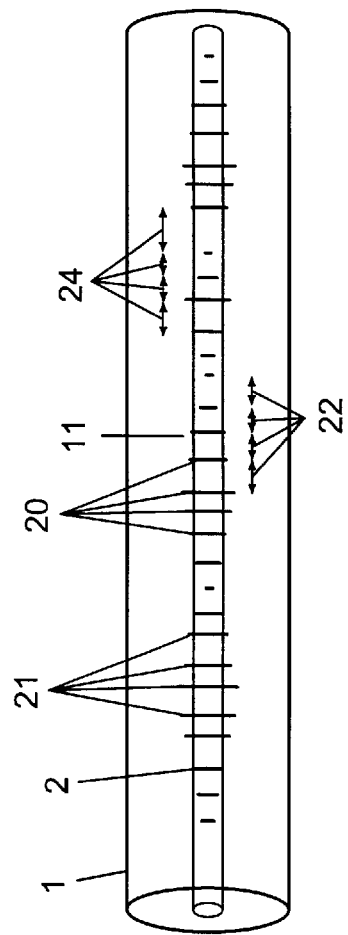

OPTICAL FIBER GRATING

FIELD OF THE INVENTION

This invention relates to an optical fiber grating defined on an optical fiber.

BACKGROUND OF THE INVENTION

There is a demand for optical fiber gratings that can be designed and manufactured such that their response is tailored to ideal responses.

In many applications such as dense wavelength division multiplexing (WDM) transmission systems and satellite communications, optical amplifiers and transmitters, optical filters having ideal amplitude and phase responses are desired in order to maximize bandwidth or to optimize the filtering function provided by the fiber Bragg grating.

Conventional fiber Bragg gratings are designed using Fourier Transform methods to determine line spacing and the like, and are manufactured using an ultra violet laser and a phase mask in order to etch lines onto an optical fiber. The resulting series of lines creates a filter that in many instances has a frequency response that is not closely matched to the optimal frequency response for the application.

High-speed, high-capacity optical fiber communication systems depend critically on the availability of high performance optical filters to accomplish a number of functions such as selection of closely packed wavelength-division-multiplexed channels or efficient compensation of link dispersion. To this end, there is a strong demand for grating-based optical devices that can be designed and manufactured such that their response is tailored as close to ideal response as possible. The technology of UV-written fiber gratings has reached now the necessary maturity to implement these high performance filters. There are a number of methods and different approaches in designing high quality grating devices. Among them, Fourier-Transform based and Electromagnetic Inverse Scattering (IS) techniques are known to offer a great variety of possibilities for the design of gratings with various degrees of accuracy.

The simplest grating design approach exploits the approximate Fourier transform (FT) relation that exists between the filter spectral response and the grating coupling function. This is a single-step process and provides the entire coupling constant distribution along the grating length. This method, also know as the first-order Born approximation, takes into account only a single first-order reflection from each line of the grating medium. The method ignores the higher order contributions stemming from multiple reflections between different lines of the grating medium and it is, therefore, applicable only to the design of low reflectivity gratings. Several modifications of the method have been proposed that improved its performance and extended its applicability to relatively high reflectivities, enabling the design of practical fiber grating filters. However, this synthesis approach is approximate in nature and, consequently, not reliable for the design of very complex and strong filters where all the higher-order multiple reflections are important and should be taken into account.

Another group of grating design algorithms is based on Inverse Scattering (IS) techniques, expressed in terms of integral equations. These types of solutions were first developed in the context of the inversion of the unidimensional Schrodinger equation, and then applied to the problem of two-component scattering. The IS integral equations are usually derived using general arguments resulting from the causality of the propagation of signals. They invert the desired grating response in the spatial frequency domain and express the grating complex coupling-constant distribution as a superposition of generalized high-order spatial harmonics. Therefore, the IS methods based on integral equations can be regarded as generalized Fourier Transform Methods.

The main drawback of integral IS methods is the difficulty involved in solving the integral equations. However, analytical IS integral-equation exact solutions can be found in the literature, when the required filter spectral response is expressed in terms of rational functions. It should be stressed that such an approach provides an exact solution to the approximated problem (approximations are inevitably introduced when expressing the required filter spectral response in terms of rational functions). This again is a one-step design process. This method has been applied in designing practical corrugated filters. However, the need to approximate the desired spectral response by rational functions is cumbersome and has resulted in compromised performance.

To overcome this limitation, an iterative solution of the IS integral equations was proposed to synthesize arbitrary spectral responses. It should be stressed that this is a parallel iteration process inverting the grating response in the spatial-frequency domain. The initial step is identical to the first-Born approximation, which, as we have already mentioned, corresponds to a simple inverse Fourier transform. Each subsequent iteration step effectively adds generalized higher-order spatial harmonics over the entire reconstructed grating profile. Therefore, each iteration alters the coupling strength along the entire grating length or, equivalently, every grating point is affected by each iteration step. Several fiber-grating devices, designed with this iterative method, have already been fabricated proving the usefulness of the method. However, the iterative solution of the IS integral equations has two main weaknesses. Firstly, the solution is approximate due to the finite number of iterations involved, which means that only a limited number of reflections within the medium are considered. This is particularly noticeable for strong gratings with discontinuities in the coupling strength. The second drawback is the low algorithm efficiency, with a complexity that grows as $O(N^3)$, where N is the number of points in the grating. Both of these weaknesses can be overcome, as the matrix coefficients that appear in the integral equation permit the use of fast algorithms of $O(N^2)$ for its solution. Several other, in essence similar, iterative inverse scattering approaches have been described in the literature.

Finally, there exists a third group of exact IS algorithms called differential or direct methods. These techniques, developed first in the context of geophysics, exploit fully the physical properties of the layered-medium structure in which the waves propagate. The methods are based again on causality arguments, and identify the medium recursively layer by layer. For this reason they are sometimes called layer-peeling or dynamic deconvolution algorithms. The complexity of the algorithm grows only as $O(N^2)$ and is usually well suited for parallel computation.

It is therefore an aim of the present invention to provide a fiber Bragg grating that matches the ideal response and to provide a method for manufacturing fiber Bragg gratings that result in filters with a substantially ideal response.

SUMMARY OF THE INVENTION

According to a non-limiting embodiment of the present invention, there is provided an optical waveguide having an optical fiber on which is defined a Bragg grating. The Bragg grating is designed using a serial iterative process. More particularly, the Bragg grating comprises a plurality of lines etched into the optical fiber, each line defining a strength, and each line have a line spacing between itself and adjacent lines in the grating. The iterative process for calculating subsequent line spacing for the grating can be a function of the strength and line spacing of the previous segments of the grating, and the impulse response thereof. The strength and line spacing define a coupling function.

By associating a length $z0$ to the subgrating, and a corresponding time $t0$ for light traveling at a group velocity within the grating subgrating to travel the length of the subgrating and reflect back the to beginning of the subgrating, a length increment $\delta z$ with a corresponding time increment $\delta t$ can be selected. The coupling function at the length $z0$ is substantially equal to the selected impulse response at the time $t0$ minus the impulse response of the grating from the first end of the grating to the length $z0$. The coupling function at the length $z0$ plus $\delta z$ is substantially equal to minus two times the difference between the selected impulse response $hR$ at the time $t0$ plus $\delta t$ and a second impulse response $hT$ at the time $t0$ plus $\delta t$.

The Bragg grating can further be characterized by a series of diminishing reflective signals. The serial iterative process can comprises applying a time window function having an overall width T, and a time delay, and the window function can be shifted by the time delay to limit the number of reflective signals considered in the iterative process. The time window function is chosen to contain a substantial amount of the selected impulse response $hR$. For example, the time window function and can contain 99.9%, 99%, or 95% of the selected impulse response $hR$.

The Bragg grating can further be characterized by a desired impulse response $hR$. In the iterative process the desired impulse response $hR$ can be multiplied by the time window function to determine the distance between a first line of the Bragg grating and a second line of the Bragg grating.

In one embodiment of the invention the Bragg grating characterizes a selected grating wavelength response, and the selected grating wavelength response is selected from the group consisting of a substantially square dispersionless filter, a substantially square dispersion compensator, a substantially square second-order dispersion compensator, a substantially square third-order dispersion compensator, a filter having multiple wavelength peaks, a filter having multiple wavelength peaks that are substantially square, and a filter having multiple wavelength peaks that are substantially square and have substantially the same peak reflectivity. The selected grating wavelength response can also be a filter having multiple wavelength peaks that are substantially square and are defined by a peak reflectivity, where the multiple wavelength peaks have substantially the same peak reflectivity and further have a reduced peak coupling ratio requirement.

The invention further includes an optical fiber filter, the filter comprising a Bragg grating defined by a grating response and an impulse response. The filter is defined by a filter response which is a predetermined function of the grating response, and the grating response is selected to be a function of the impulse response at a time $t0$ and at a length $z0$ along the Bragg grating.

In one embodiment, the invention provides for an optical waveguide defining a Bragg grating having a first end and a second end. Light propagating in the optical waveguide is defined by a group velocity. The Bragg grating is defined by a selected grating reflectivity and dispersion response which varies with a wavelength. The grating is also defined by a selected impulse response $hR$ that varies with a time t, and a coupling function that varies with a length z that is measured from the first end of the grating. A first length $z0$, with a corresponding first time $t0$, that extends from the first end to the first length $z0$ defines a subgrating in the overall grating. A length increment $\delta z$ with a corresponding time increment $\delta t$ defines the line spacing for the next line of the grating following the subgrating. The subgrating has a second impulse response $hT$ that varies with a time t. The first length $z0$ is equal to the first time $t0$ multiplied by the group velocity divided by 2, and the length increment $\delta z$ is equal to the time increment $\delta t$ multiplied by the group velocity divided by 2. The selected impulse response and the selected grating reflectivity and dispersion response are Fourier Transform pairs. The coupling function at the length $z0$ plus $\delta z$ is substantially equal to minus two times the difference between the selected impulse response $hR$ at the time $t0$ plus $\delta t$ and the second impulse response $hT$ at the time $t0$ plus $\delta t$. The Bragg grating is designed such that $z0$ can be successively, iteratively stepped from the first end to the second end resulting in an actual impulse response that is substantially equal to the selected impulse response.

The invention also provides a method for designing and manufacturing an optical fiber Bragg grating having a selected grating response. The method includes the steps of providing an optical fiber, defining a starting point for the Bragg grating to be fabricated on the optical fiber, and etching a first line on the optical fiber. Then a subgrating length is defined on the optical fiber by moving a distance $z0$ along the optical fiber. A second line is then etched on the optical fiber at the distance $z0$. A response for the subgrating is calculated, and the response for the subgrating is used to determine the line spacing for the next line in the grating.

BRIEF DESCRIPTION OF THE DRAWINGS

Embodiments of the invention will now be described solely by way of example and with reference to the accompanying drawings in which:

FIG. 1 is a diagram of an embodiment of the present invention;

FIG. 2 is a diagram of an embodiment of the present invention depicting line spacing and strength

DETAILED DESCRIPTION OF PREFERRED EMBODIMENTS OF THE INVENTION

Figure 3:
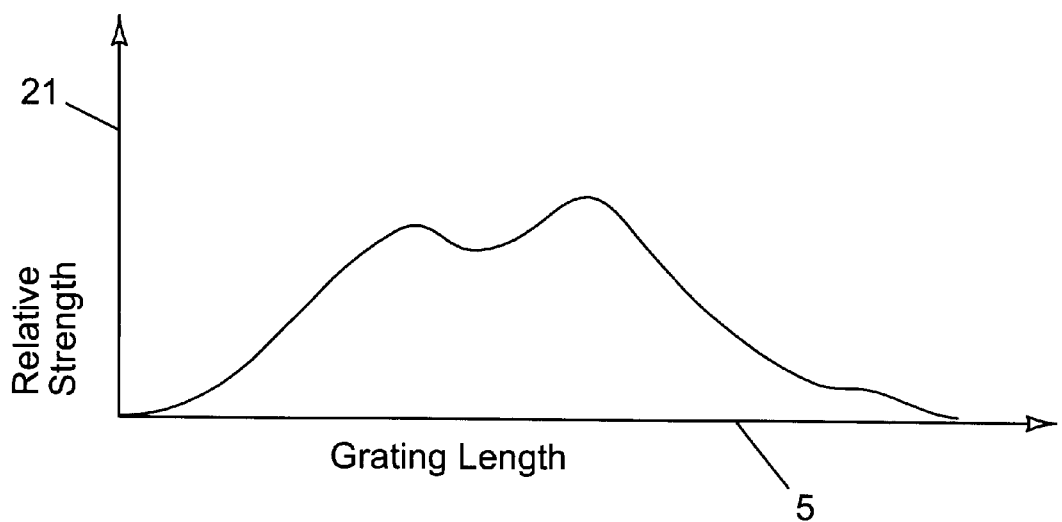
FIG. 3 is a diagram of an embodiment of the present invention depicting line strength.

We have developed a fiber grating synthesis method which uses a synthesis algorithm based on a differential method. More particularly, the algorithm is based on the differential IS method, wherein the medium is inverted in the time domain. It should be stressed that, in contrast with the iterative integral IS algorithm, the iteration process of the present invention is serial and, as a consequence, each grating section is fully reconstructed in a single step and used for the determination of subsequent segments (layers). The inverse scattering principle relies on the synthesis in the time domain of the grating impulse response. The first step is to build a physically realizable impulse response that closely corresponds to the required spectral response of the filter. At each time instant $t_0$ and corresponding maximum penetration length $L(t_0)$, the impulse response is renormalised, by subtracting the contributions of all the possible previous multiple reflections within the grating (past history), providing uniquely the grating coupling constant at $L(t_0)$. The algorithm can be practically implemented in different ways. Initially, the grating has to be adequately discretised. Then, either mixed time-frequency or purely time leapfrogging strategies can be used. Preferably, a transfer matrix method is used to solve the propagation problem in both cases.

FIG. 1 shows an optical waveguide 1 defining a Bragg grating 2 wherein the Bragg grating 2 is designed using an iterative process in accordance with the present invention. The optical waveguide 1 can comprise an optical fiber or a planar waveguide. The planar waveguide can be constructed from glass with indiffused waveguides. The optical waveguide 1 can comprise a core 9 and a cladding 10 and at least part of at least one of the core 9 and cladding 10 are photosensitive. Input light 6 of a wavelength 7 launches an optical mode 11 which propagates along the optical waveguide 1 with a defined group velocity 12. The Bragg grating 2, which is defined on the core 9, induces reflection of the input light 6 yielding reflected light 8. The Bragg grating 2 is defined by a first end 3 and a second end 4 and a length 5 along the grating measured from the first end 3. The Bragg grating 2 has an overall length 13 as shown in FIG. 1.

The iterative process is preferably started at the first end 3 of the Bragg grating 2 moving along the grating 2 in incremental steps. Alternatively, the iterative process can be commenced at an arbitrary position within the Bragg grating 2, and elements are added to the Bragg grating 2 in a random or sequential fashion.

FIG. 2 shows the Bragg grating 2 in more detail. The Bragg orating 2 comprises a plurality of lines 20 having a line spacing 24, each line 20 being defined by a respective strength 21 indicated by the relative length of the line 20, and a relative displacement 22 which is proportional to the spatial derivative of the line spacing 24, and wherein the iterative process is used to calculate the line strength 21 and the relative displacement 22 of at least some of the lines 20. By lines 20 we mean the local refractive index change within the optical waveguide 1 that forms a Bragg grating 2. These can be blazed at an angle, straight, curved, non-continuous, uniform, or non-uniform, however they will have a periodicity that corresponds to the local Bragg wavelength.

Figure 4:
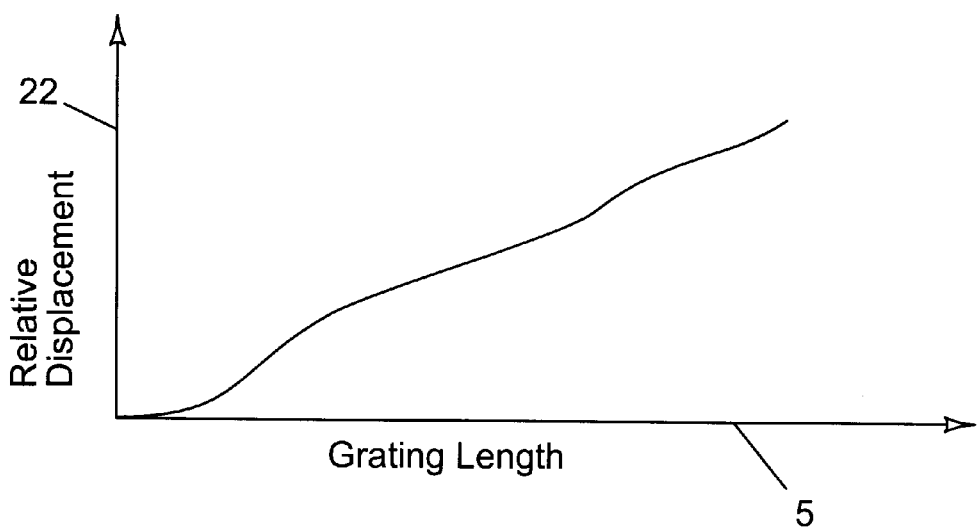
FIG. 4 is a diagram of an embodiment of the present invention depicting relative displacement.
Figure 5:
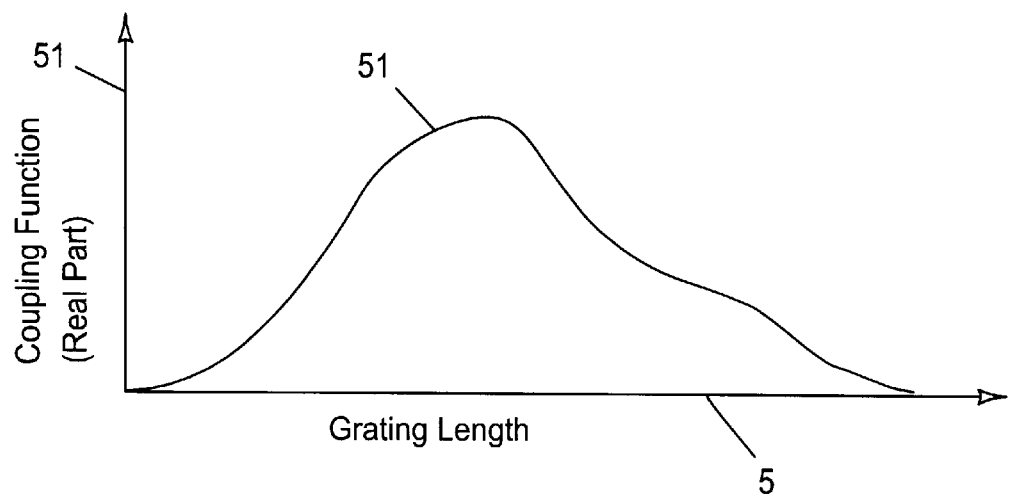
FIG. 5. is a diagram of an embodiment of the present invention depicting the real part of the coupling coefficient.
Figure 6:
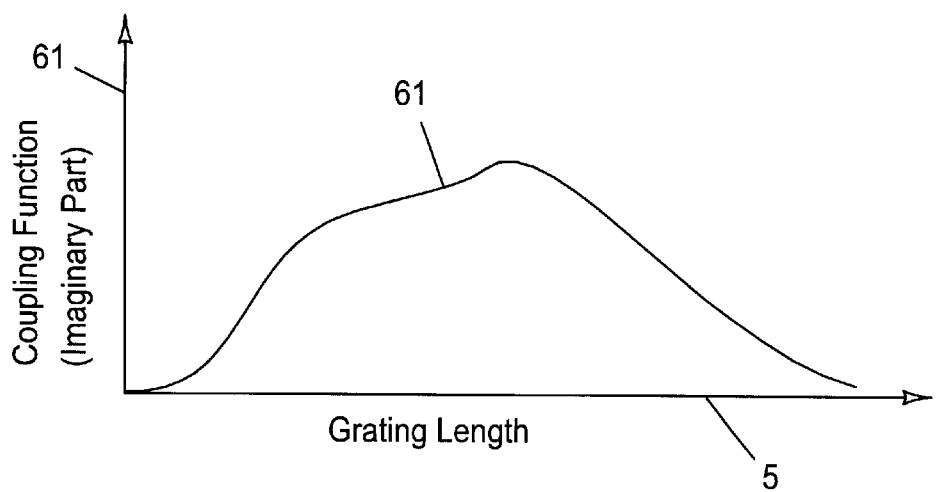
FIG. 6 is a diagram of an embodiment of the present invention depicting the imaginary part of the coupling coefficient.

A better description of the strength 21 and the relative displacement 22 of the lines 20 is shown in FIGS. 3 and 4 respectively. FIG. 3 shows the relative strength 21 of the lines 20 as a function of the length 5. FIG. 4 shows the relative displacement 22 of the lines 20 as a function of the length 5. The relative strength 21 and the relative displacement 22 of the lines 20 can be described by a coupling function 50 (see FIG. 11) which is a single complex parameter that can be used to calculate the reflection of the light 8 as a function of the length 5 and the wavelength 7 of the input light 6. The coupling function 50 has a real part 51 and an imaginary part 61 as shown in FIGS. 5 and 6 respectively. The line strength 21 is proportional to the modulus of the coupling function 50 and the relative displacement 22 is proportional to the spatial derivative of the argument of the coupling function.

Figure 7:
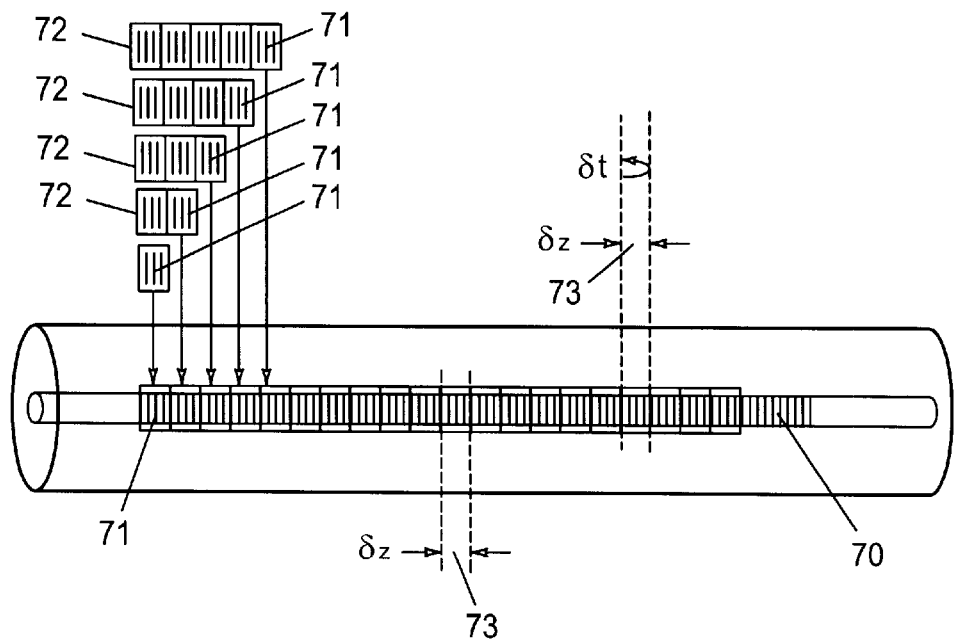
FIG. 7 is a diagram of an embodiment of the present invention depicting an iterative process.

FIG. 7 shows a Bragg grating 70 wherein the strength 21 and the relative displacement 22 of the lines 20 are determined using an iterative process starting from the first end 3 and continuing through to the second end 4. The iterative process is illustrated by grating increments 71 having a length increment δz 73 which are designed in turn to build the Bragg grating 70. The figure shows the build up of the Bragg grating 70 to form subgratings 72 that become increasingly long as more grating increments 71 are added.

The iterative process can be a serial iterative process in that the characteristics of each grating increment 71 is designed in turn. It is preferable that once a characteristic of any one grating increment 71 is designed, the iterative process does not require the characteristic of the grating increment 71 to be redesigned. The iterative process results in the coupling function 50 of the Bragg grating 70. The coupling function is a function of the group velocity 12 (FIG. 1).

The length increment δz 73 is preferably infinitesimal, but the finite length required in practice to achieve an adequate design is dependent upon the desired reflection characteristics of the Bragg grating 70. Preferably, the method uses a length increment of about 0.1 micron to 500 microns, and a line spacing of about 0.1 microns to 5 microns.

Figure 8:
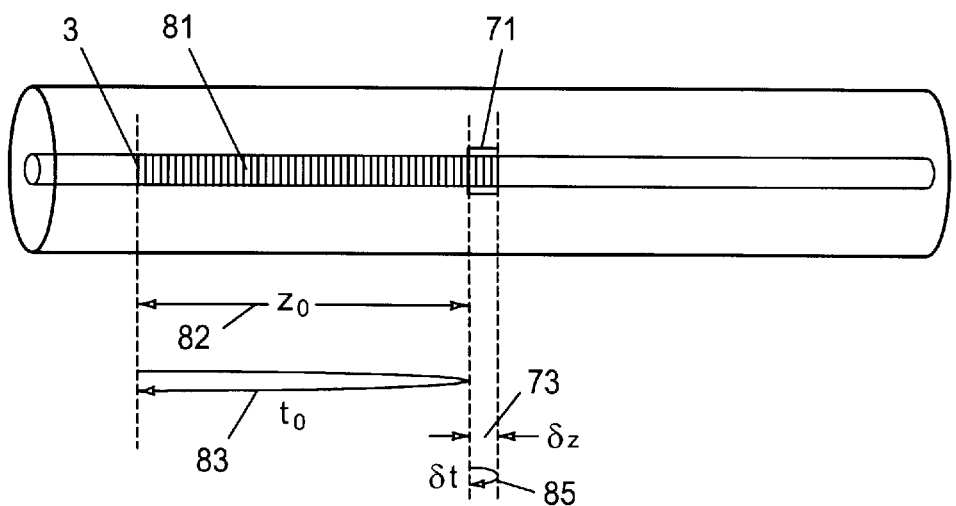
FIG. 8 is a diagram of an embodiment of the present invention depicting a subgrating.

FIG. 8 shows a subgrating 81 which is produced after adding several of the grating increments 71 shown in FIG. 7. The subgrating 81 has a first length z0 82 and a corresponding first time t0 83 which is related to the first length z0 82 by the group velocity 12 (FIG. 1). The first time t0 83 is essentially twice the time taken for the optical mode 11 to propagate along the length z0 82.

FIG. 8 also shows the grating increment 71 being added to the subgrating 81. The length increment δz 73 and the group velocity 12 define a corresponding time increment δt 85 which is essentially twice the time taken for the optical mode 11 to propagate along the grating increment 71.

Figure 9:
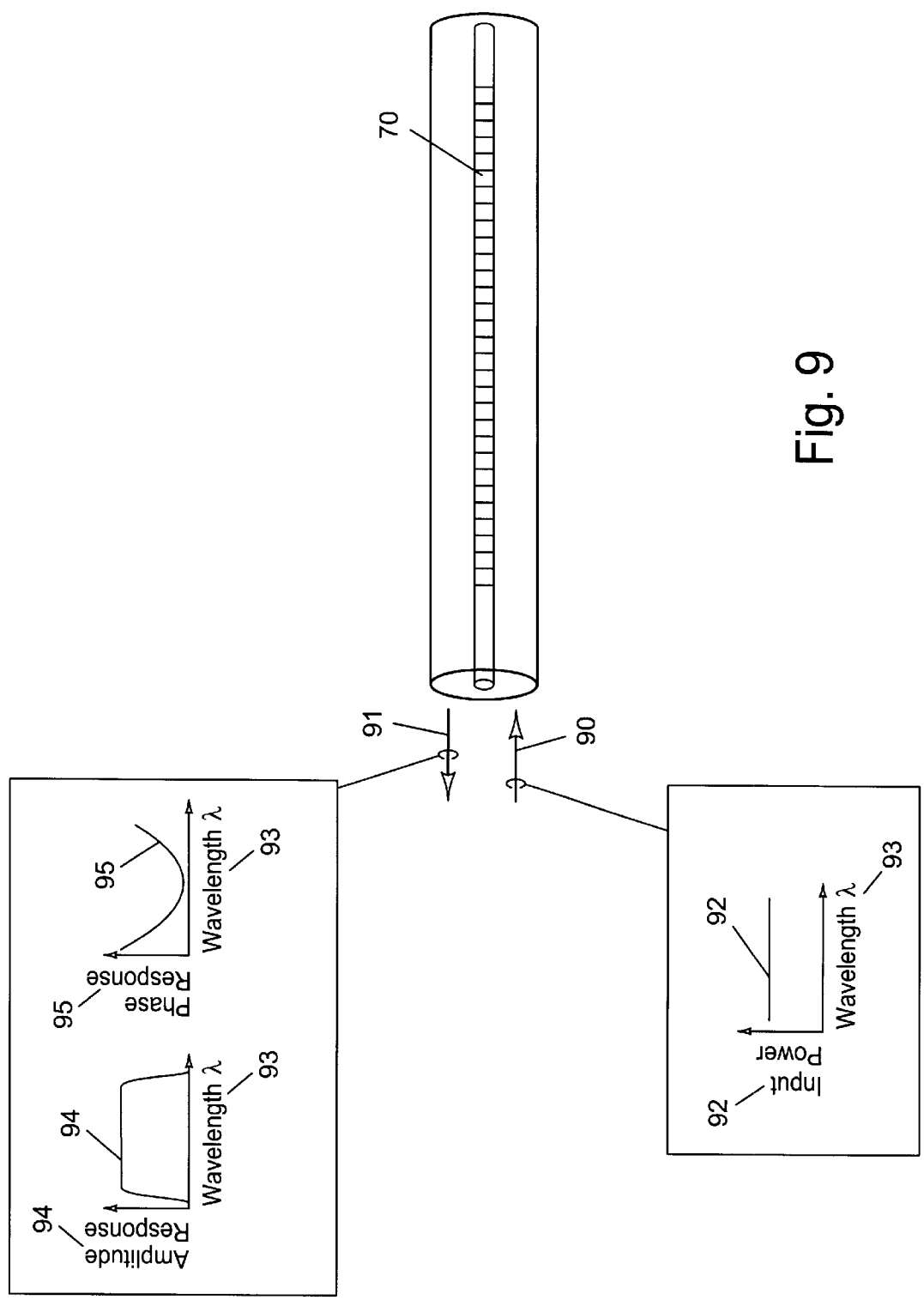
FIG. 9 is a diagram of an embodiment of the present invention depicting the amplitude and phase response.
Figure 10:
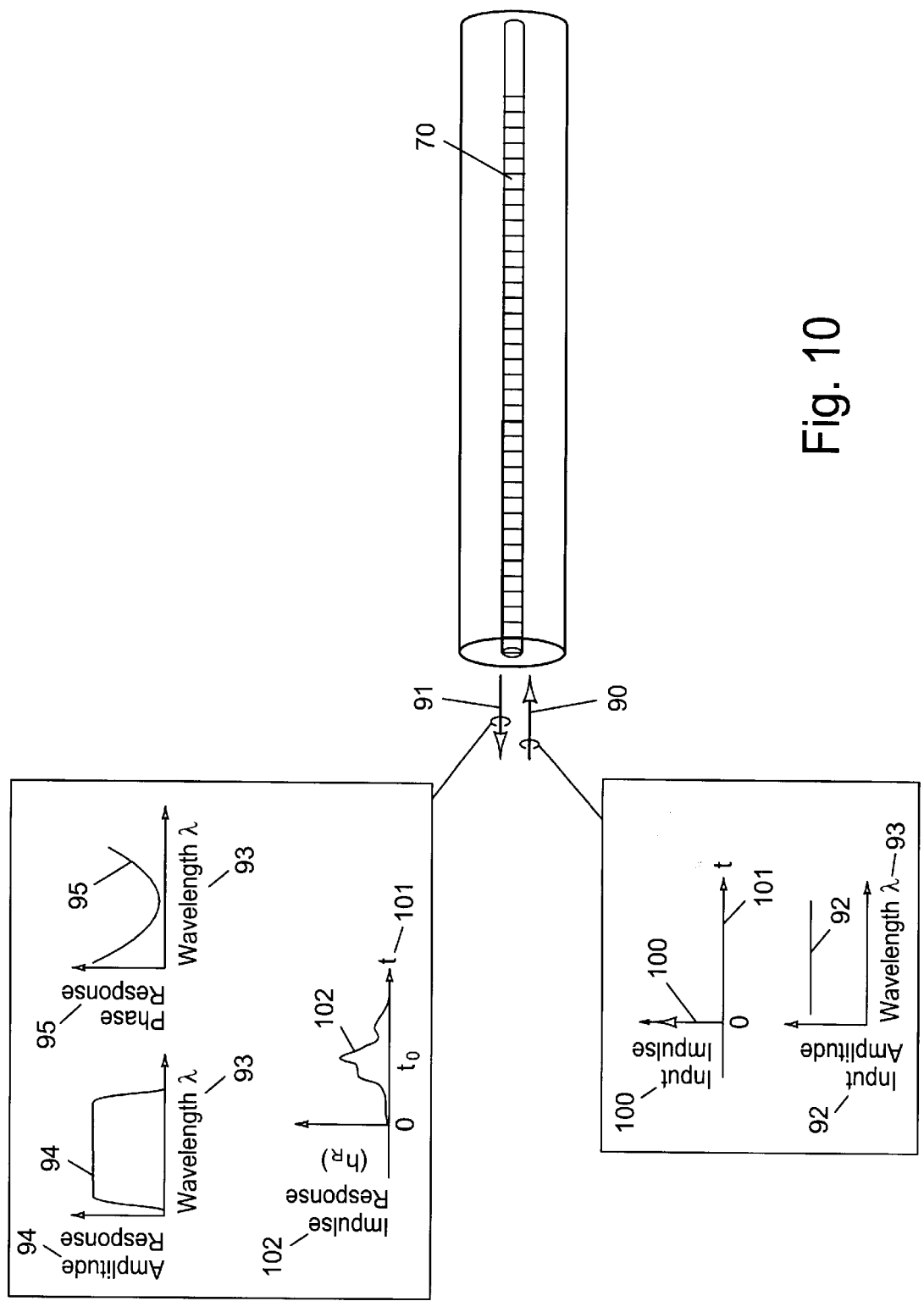
FIG. 10 is a diagram of an embodiment of the present invention depicting the impulse response.

FIG. 9 shows input light 90 and reflected light 91 from the Bragg grating 70. The input light 90 has a constant amplitude 92 with a wavelength 93. The reflected light has an amplitude response 94 and a phase response 95 that varies with the wavelength 93. As shown in FIG. 10, the input light 90 can also be characterized by an input impulse response 100 which varies with a time t 101 and the reflected light 91 can be characterized by an impulse response hR 102. The impulse response hR 102 is a function of the coupling coefficient of the coupling function 50. The impulse response hR 102 and the amplitude and phase response 94, 95 are Fourier Transform pairs.

The amplitude response 94, the phase response 95 and the impulse response hR 102 are defined as the desired responses of the Bragg grating 70. Design errors and manufacturing errors result in a manufactured amplitude response (not shown), a manufactured phase response (not shown) and a manufactured impulse response (not shown) which result in differences between the desired response and the actual response of the Bragg grating 70. It is the object of this invention to reduce these differences as much as practically possible.

Figure 11:
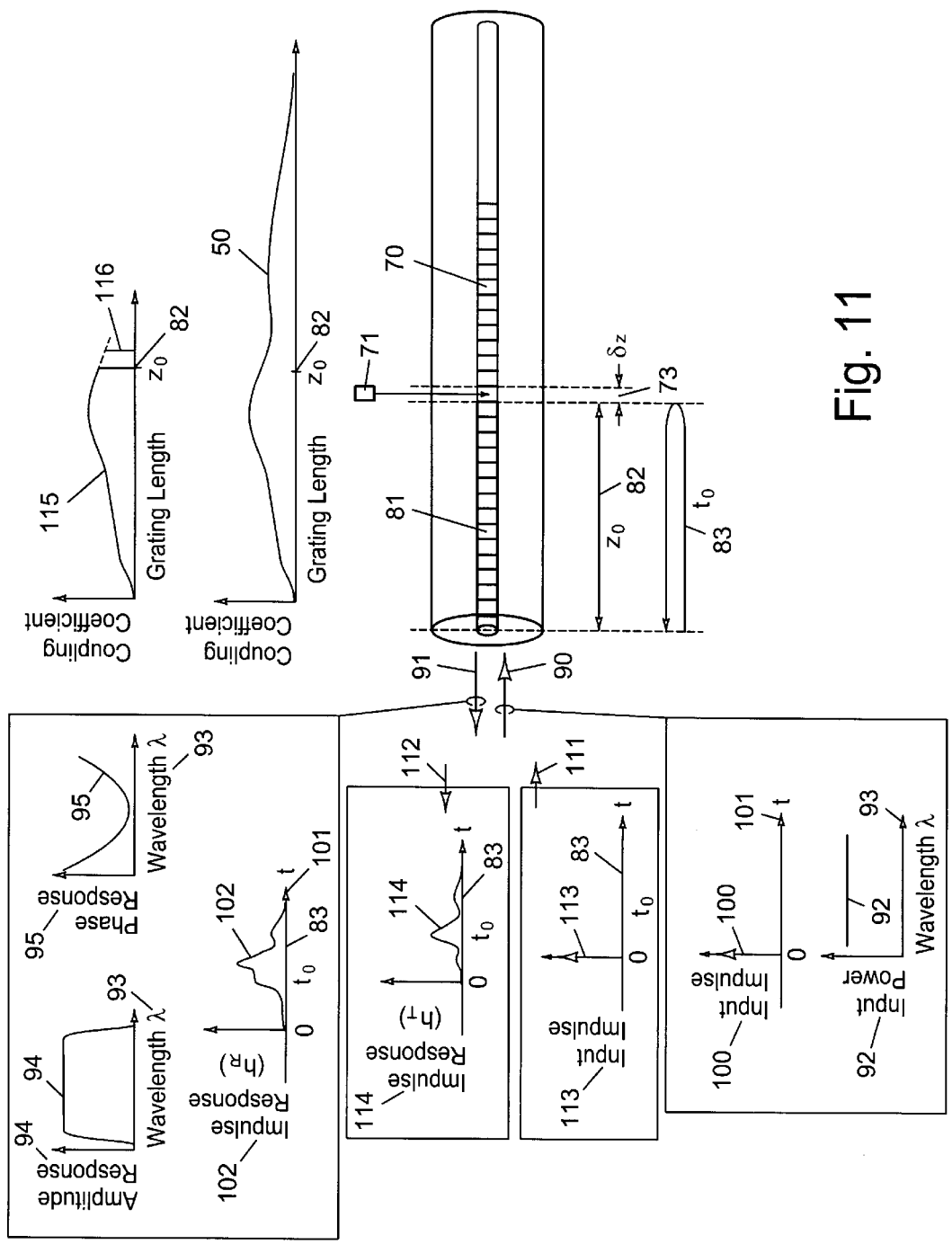
FIG. 11 is a diagram of an embodiment of the present invention depicting the impulse response of the subgrating.

FIG. 11 shows the Bragg grating 70 and the subgrating 81. Also shown is input light 111 into the subgrating 81 and the reflected light 112 from the subgrating 81. The reflected light 112 is defined such that none of the input light 111 enters into the rest of the Bragg grating 70 that is assumed not to exist for the purposes of this definition. The input light 111 can be characterized by a second impulse 113 and the reflected light 112 by a second impulse response hT 114. A second coupling coefficient function 115 of the subgrating 81 can be defined as the coupling coefficient function 50 that is truncated at the length z0 82. The second impulse response hT 114 is a function of the second coupling coefficient function 115.

FIG. 11 also shows a grating increment 71 being added to the subgrating 81. The coupling coefficient 116 of the grating increment 71 is preferably minus two times the difference between the impulse response hR 102 measured at the time t0 83 and the second impulse response hT 114 at the time t0 83.

The coupling coefficient function 50 of the grating 70 can be iteratively calculated by successively incrementing the first length z0 82 from the first end 3 by length increment δz 73 and calculating the coupling coefficient 116 of each grating increment 71. The coupling coefficient function at the length z0 82 plus the length increment δz 73 is equal to the coupling coefficient 116.

Accordingly, it is seen that the iterative process for designing a Bragg grating in accordance with the present invention can be a function of the amplitude response 94, as well as a function of the phase response 95.

Another aspect of the present invention is what we term "windowing", which reduces the length of the grating to practical lengths which can be more easily processed during the design stage.

Figure 12:
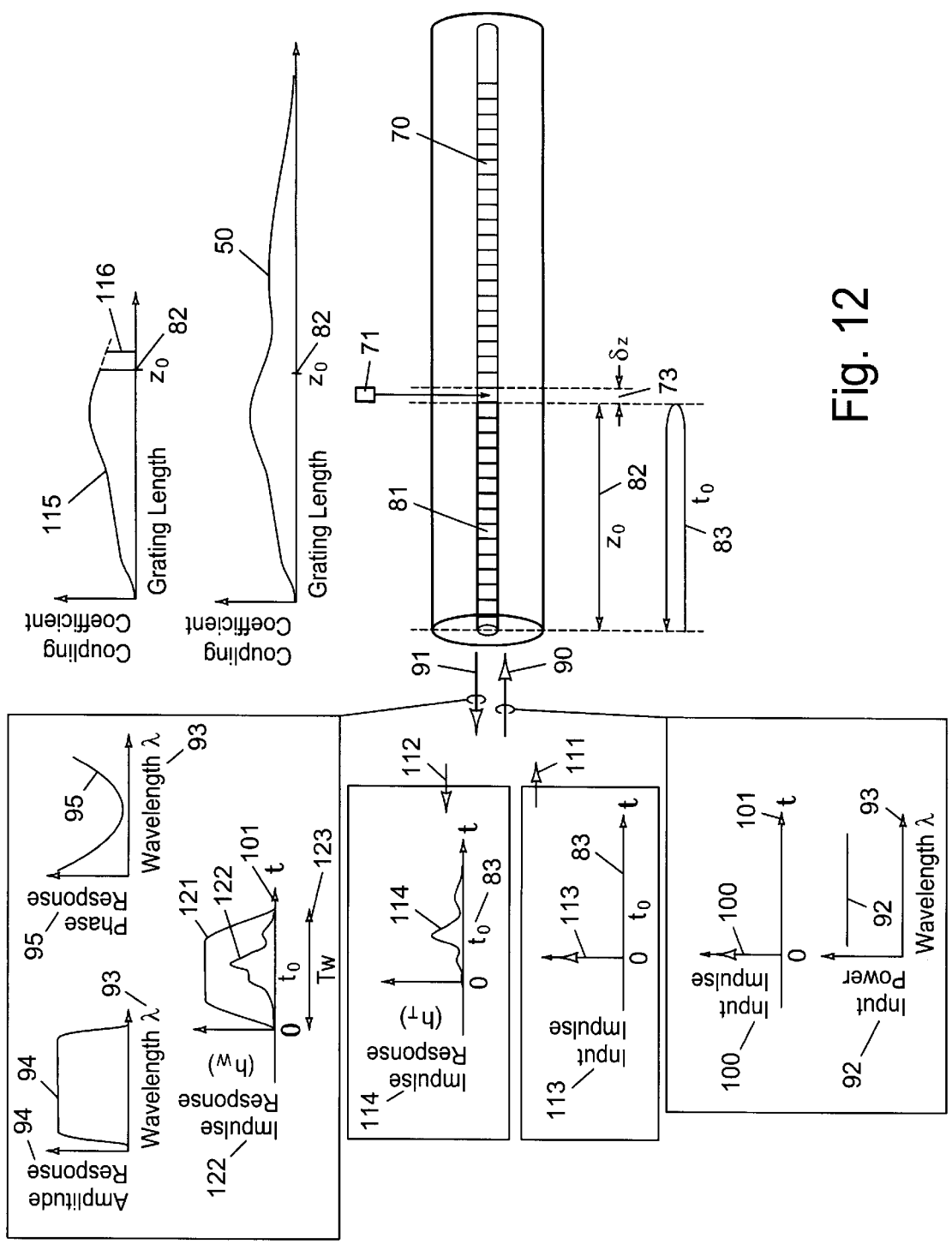
FIG. 12 is a diagram of an embodiment of the present invention depicting a windowed impulse response.

FIG. 12 shows a truncated grating 81, a time window function Tw 121 and a windowed impulse response hW 122 that is calculated by multiplying the time window function 121 with the impulse response hR 102. The time window function 121 has a width Tw 123. The advantage is that this process can be used to truncate the total length of the grating 70 and also that the process limits the number of reflective signals considered in the iterative process. FIG. 12 also shows a grating increment 71 being added to the subgrating 81. The coupling coefficient 116 of the grating increment 71 is preferably minus two times the difference between the windowed impulse response hW 122 measured at the time t0 83 and the impulse response hT 114 at the time to 83. The coupling coefficient function 50 of the truncated grating 120 can be iteratively calculated by successively incrementing the first length z0 82 from the first end 3 by length increment δz 73 and calculating the coupling coefficient 50 of each grating increment 71. The coupling coefficient function 50 at the 19 length z0 82 plus the length increment δz 73 is equal to the coupling coefficient 116.

The time window function 121 can be chosen to contain a substantial amount of the impulse response hR 102. The time window function 121 can be chosen to contain approximately 99.9% of the impulse response hR 102. Alternatively, figures of 99%, 95% or even 90% can be acceptable, but the higher the amount that is contained, the closer the design will be to the desired response.

Often, it is desirable to attempt to design a grating with a response that is as close as possible to a desired amplitude and phase response. Unfortunately, this approach often leads to problems because the resulting grating design can be non-realizable. Our solution to this problem is windowing and time shifting the windowed impulse response function which then makes it causal. And this gives the closest practical implementation to the desired response.

Figure 13:
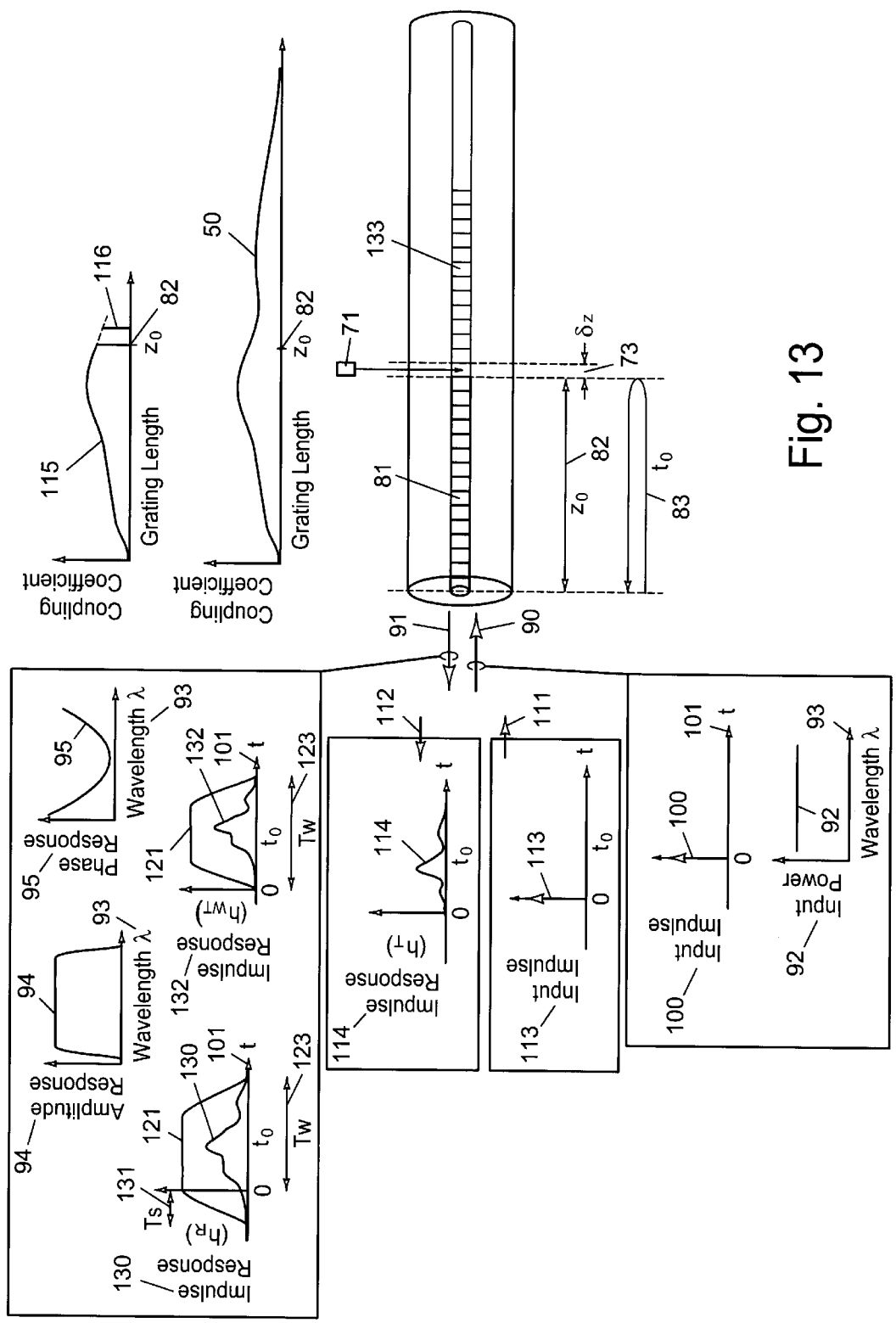
FIG. 13 is a diagram of an embodiment of the present invention depicting a windowed, time shifted impulse response.

FIG. 13 shows an impulse response hR 130 that is non-realizable and a realizable grating 133. The impulse response hR 130 is shown multiplied by the time window function 121, the result being time shifted by a time interval Ts 131 in order to ensure that there is no reflected light before the input impulse 100. The result is a time shifted, windowed impulse response hWT 132. FIG. 13 also shows a grating increment 71 being added to the subgrating 81. The coupling coefficient 116 of the grating increment 71 is preferably minus two times the difference between the time shifted, windowed impulse response hWT 132 measured at the time t0 83 and the impulse response hT 114 at the time t0 83. The coupling coefficient function 50 of the realizable grating 133 can be iteratively calculated by successively incrementing the first length z0 82 from the first end 3 by length increment δz 73 and calculating the coupling coefficient 50 of each grating increment 71. The coupling coefficient function 50 at the length z0 82 plus the length increment δz 73 is equal to the coupling coefficient 1 16.

The time interval Ts 131 can be equal to half the width Tw 123 of the time window function 121. Alternatively the time interval Ts 131 can be less than half the width Tw 123.

The length increments δz 73 shown in FIGS. 7 through to 13 are preferably non-overlapping and are preferably of the same linear length. The length increments δz 73 can be of different lengths, and can also be overlapping.

Figure 14:
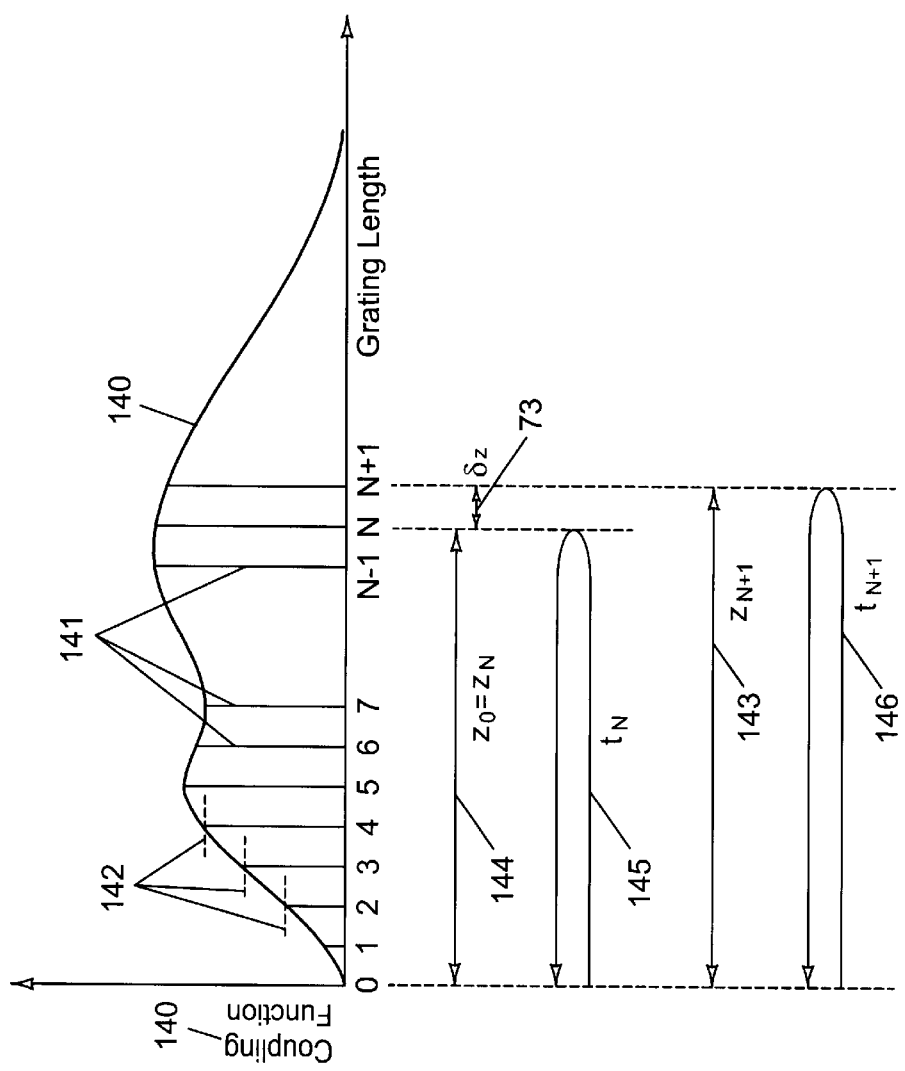
FIG. 14 is a diagram of an embodiment of the present invention depicting a discrete coupling function.

FIG. 14 shows a coupling function 140 that is discrete rather than a continuous function. The height of each discrete line 141 denotes the coupling strength 142 of each grating increment 71 of length increment δz 73. The coupling strength 142 at a grating length $Z_{N+1}$ 143, denoted here by $q(Z_{N+1})$, is given by the solution of the following equation:

$$Q_R(t_{N+1}) = -2 \frac{\Delta h(t_{N+1})}{Q_T(t_N)} \qquad (1)$$

where $$Q_R(t_{N+1}) = \frac{q(z_{N+1}) \tanh(|q(z_{N+1})|\delta z)}{|q(z_{N+1})|} \qquad (2)$$

and $$Q_T(t_N) = \prod_{m=0}^{N} [\cosh(|q(z_N)|\delta z)]^{-2} \qquad (3)$$

The coupling strength 142 at a grating length $Z_N = Z_O$ 144 is denoted here by $q(z_N)$. In the case where all length increments δz 73 are equal, the subgrating length $Z_N = Z_O$ 144 is given by: $Z_N = N \times \delta z$ and the grating length $Z_{N+1}$ 143 is given by: $Z_{N+1} = (N+1) \times \delta oz$. However, in the case where some or all the length increments δz 73 are unequal, the subgrating length $Z_N = Z_O$ 144 is given by the sum $$z_N = \sum_{m=0}^{N} \delta z_m$$

and the grating length $Z_{N+1}$ 143 is given by the sum $$z_{N+1} = \sum_{m=0}^{N+1} \delta z_m.$$

Here $\delta z_m$ denotes the length increment of the mth grating increment. The subgrating has a length zN 144 and a corresponding time tN 145 which is related to the length zN 144 by the group velocity 12. The time tN 145 is twice the time taken for the optical mode 11 to propagate along the length zN 144. The grating has a length zN+1 143 and a corresponding time tN+1 146 which is related to the length zN+1 143 by the group velocity 12. The time tN+1 146 is twice the time taken for the optical mode 11 to propagate along the length zN+1 143.

The grating is designed by repeating serially the same process preferably over the entire grating length. However the process can be restricted to only one part of the desired grating.

Figure 15:
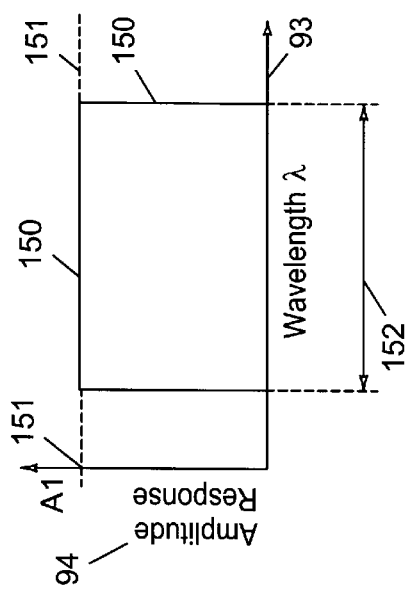
FIG. 15 is a diagram of an embodiment of the present invention depicting the amplitude response of a square filter.
Figure 16:
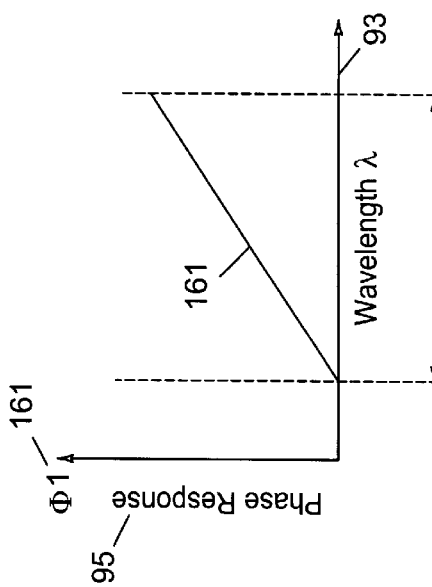
FIG. 16 is a diagram of an embodiment of the present invention depicting the phase response of a square filter.

The amplitude response 94 can be a substantially square function 150 as shown in FIG. 15. The square function R1(λ) 150 is equal to A1 151 within a passband 152, and substantially equal to zero outside the passband 152. The phase response 95 can be a substantially linear function φ1(λ) 161 as shown in FIG. 16 within the passband 152.

Figure 17:
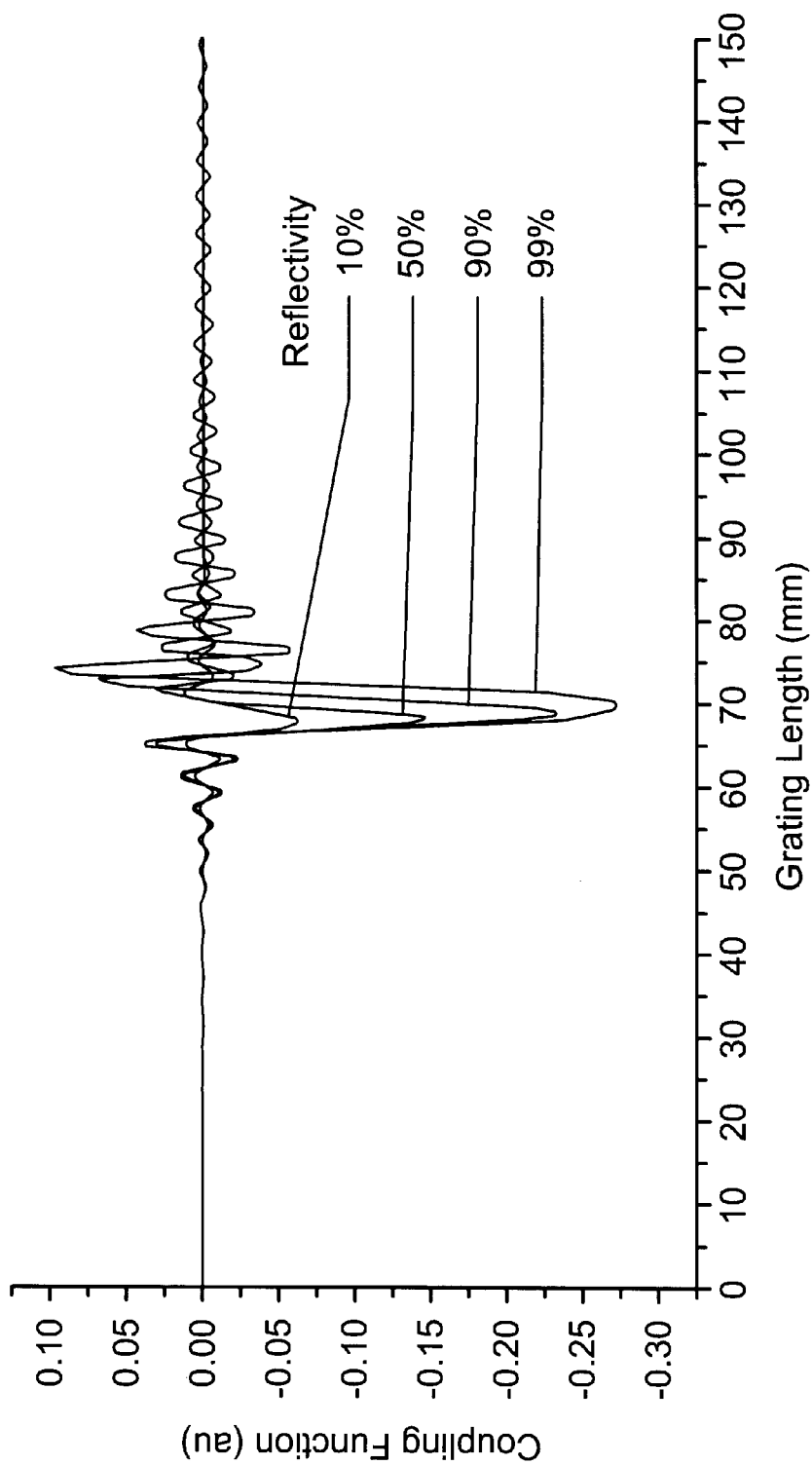
FIG. 17 is a diagram of an embodiment of the present invention depicting the coupling function of a square filter.

The amplitude A1 can be in the range 0.1% to 99.999999%. FIG. 17 shows the resulting coupling function for amplitudes A1 of 10%, 50%, 90% and 99% according to the present invention. For these designs, the coupling function is real and is proportional to the line strength 21. Since the coupling function is real, the relative displacement 22 is substantially zero and thus the line spacing 24 is constant. The phase response 95 can also be non-linear, parabolic or piecewise continuous.

Figure 18:
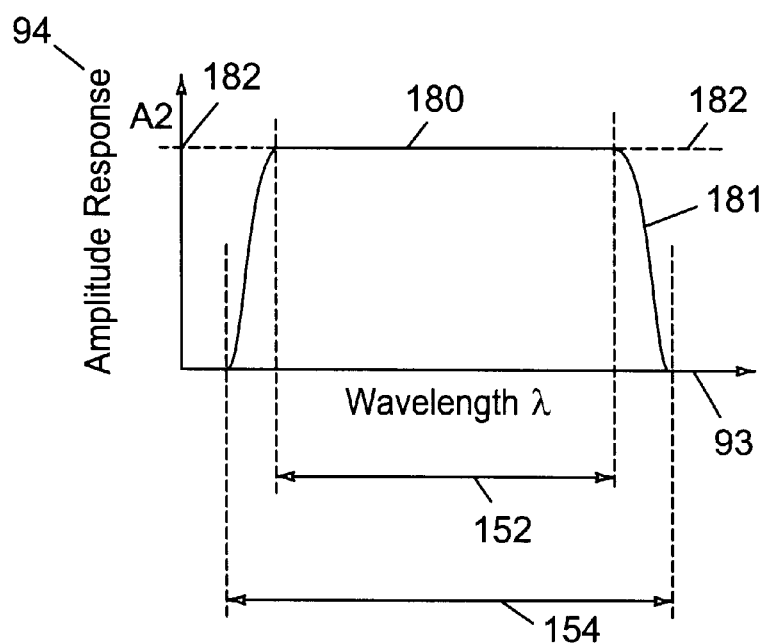
FIG. 18 is a diagram of an embodiment of the present invention depicting the amplitude response of a square filter with sloping edges.
Figure 19:
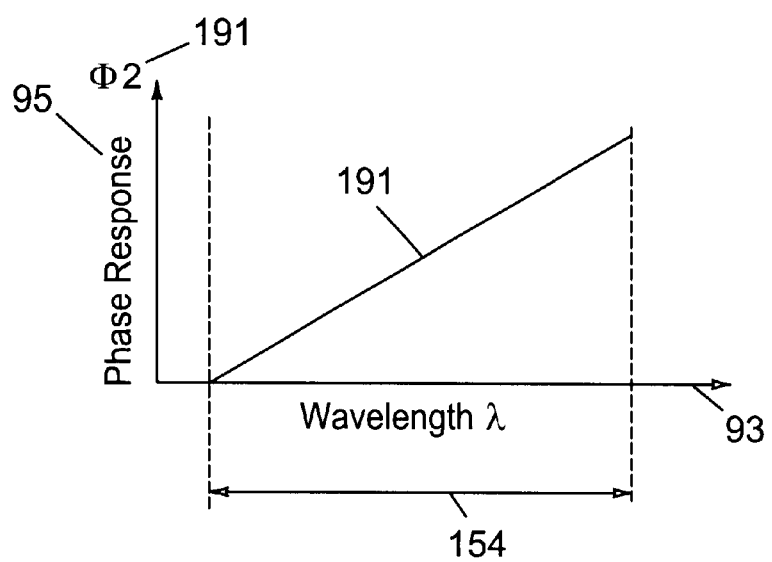
FIG. 19 is a diagram of an embodiment of the present invention depicting the phase response of a square filter with sloping edges.

The amplitude response 94 can be a substantially square function R2(λ) 180 with sloping edges 181 as shown in FIG. 18. The function R2(λ) 180 is equal to A2 182 within a passband 152, and substantially equal to zero outside an outer passband 154. The phase response 95 can be a substantially linear function φ2(λ) 191 as shown in FIG. 19 within the outer passband 154.

Figure 20:
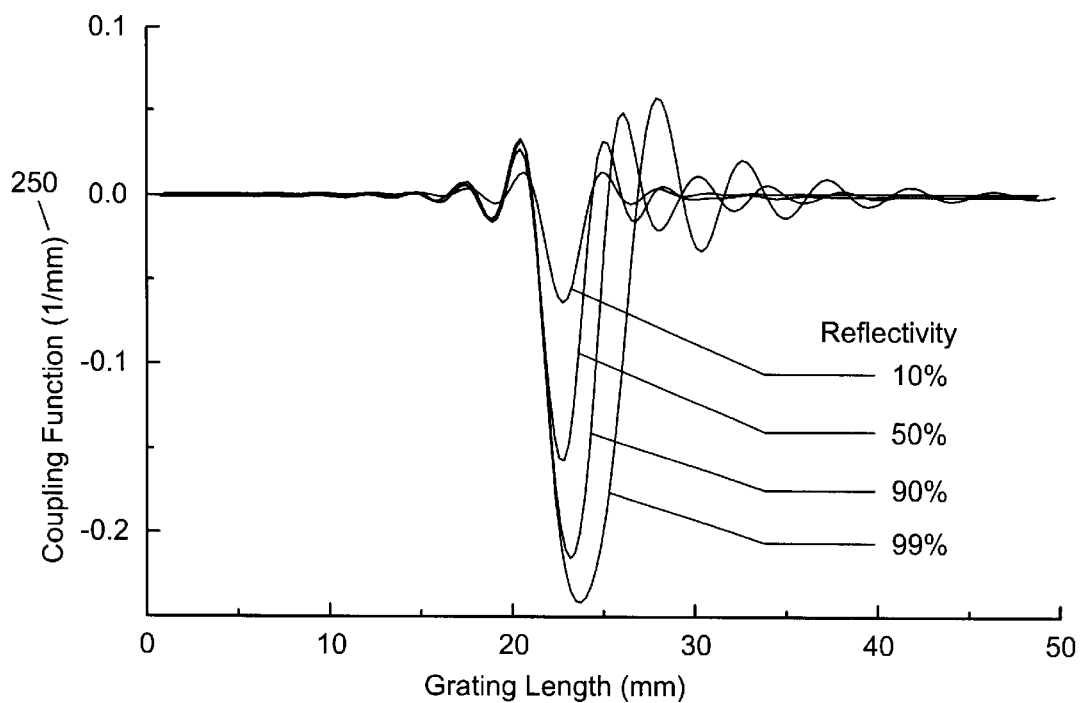
FIG. 20 is a diagram of an embodiment of the present invention depicting the coupling function of a square filter with sloping edges.

The amplitude A2 can be in the range 0.1% to 99.999999%. FIG. 20 shows the resulting coupling function 250 for amplitudes A2 of 10%, 50%, 90% and 99% according to the present invention where a bandwidth utilization 201 defined as the ratio of the passband 152 to the outer passband 154 is 75%. For these designs, the coupling function 250 is real and is proportional to the line strength 21. Since the coupling function 250 is real, the relative displacement 22 is substantially zero and thus the line spacing 24 is constant. The phase response 95 can also be non-linear, parabolic or piecewise continuous.

Figure 21:
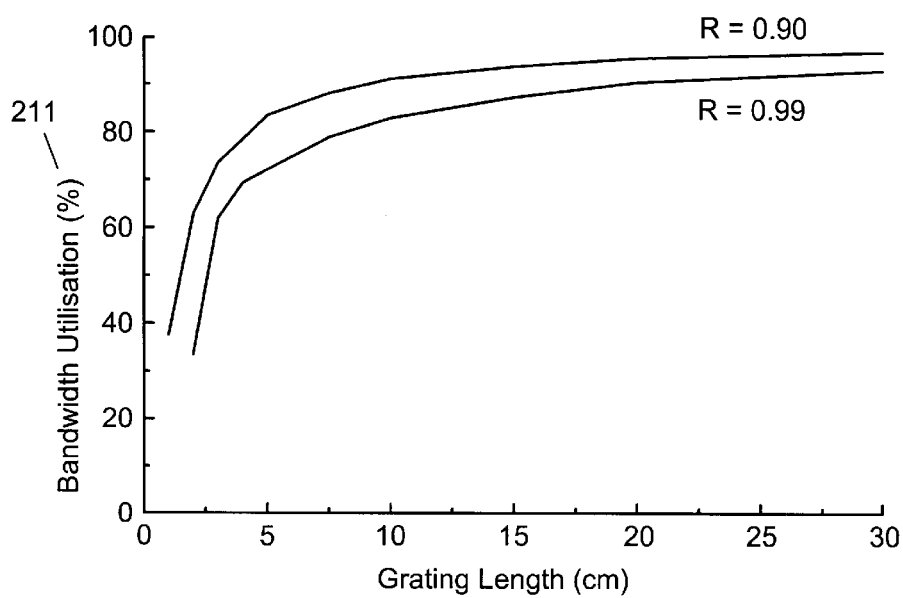
FIG. 21 is a diagram of an embodiment of the present invention depicting bandwidth utilization of a square filter with sloping edges.
Figure 22:
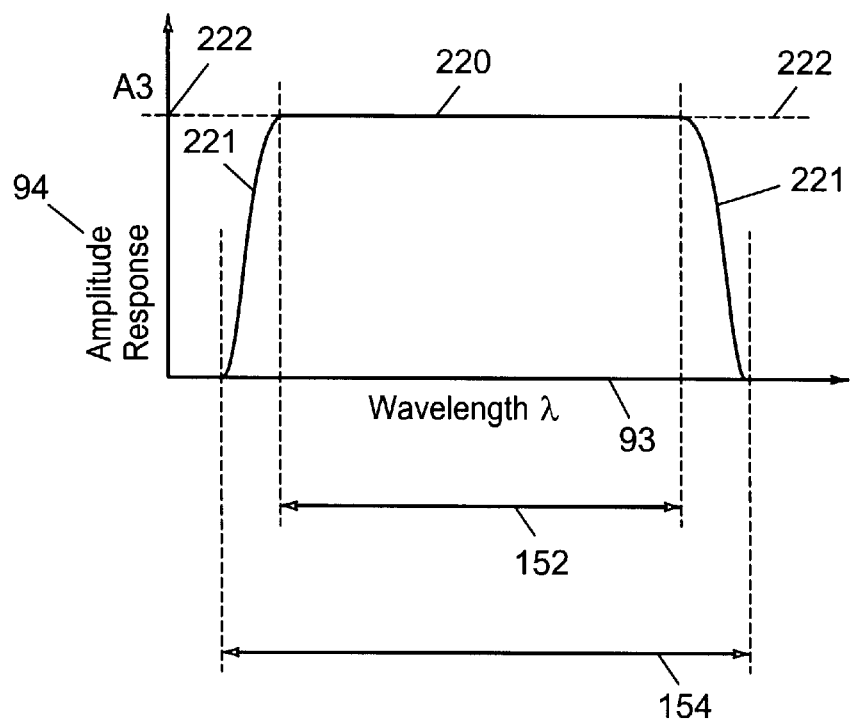
FIG. 22 is a diagram of an embodiment of the present invention depicting the amplitude response of a square dispersion compensating filter.

FIG. 21 shows the bandwidth utilization 211 as a function of the grating length 13 for the amplitude A2 equal to 90% and 99%. The advantage of the designs resulting from the present invention is that the bandwidth utilization 211 can be in excess of 90%. This has important implications for dense-wavelength-division-multiplexing telecommunication systems.

The amplitude response 94 can be a substantially square function R3(λ) 220 with sloping edges 221 as shown in FIG.

Figure 23:
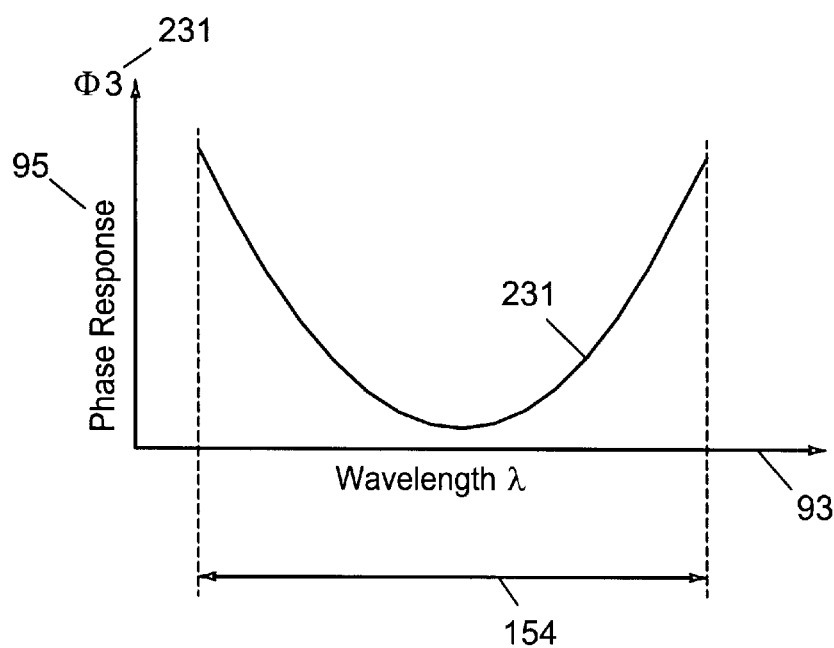
FIG. 23 is a diagram of an embodiment of the present invention depicting the phase response of a square dispersion compensating filter.

22. The function $R3(\lambda)$ 220 is equal to A3 within a passband 152, and substantially equal to zero outside an outer passband 154. The phase response 95 can be a substantially quadratic function $\phi3(\lambda)$ 231 as shown in FIG. 23 within the outer passband 154.

Figure 24:
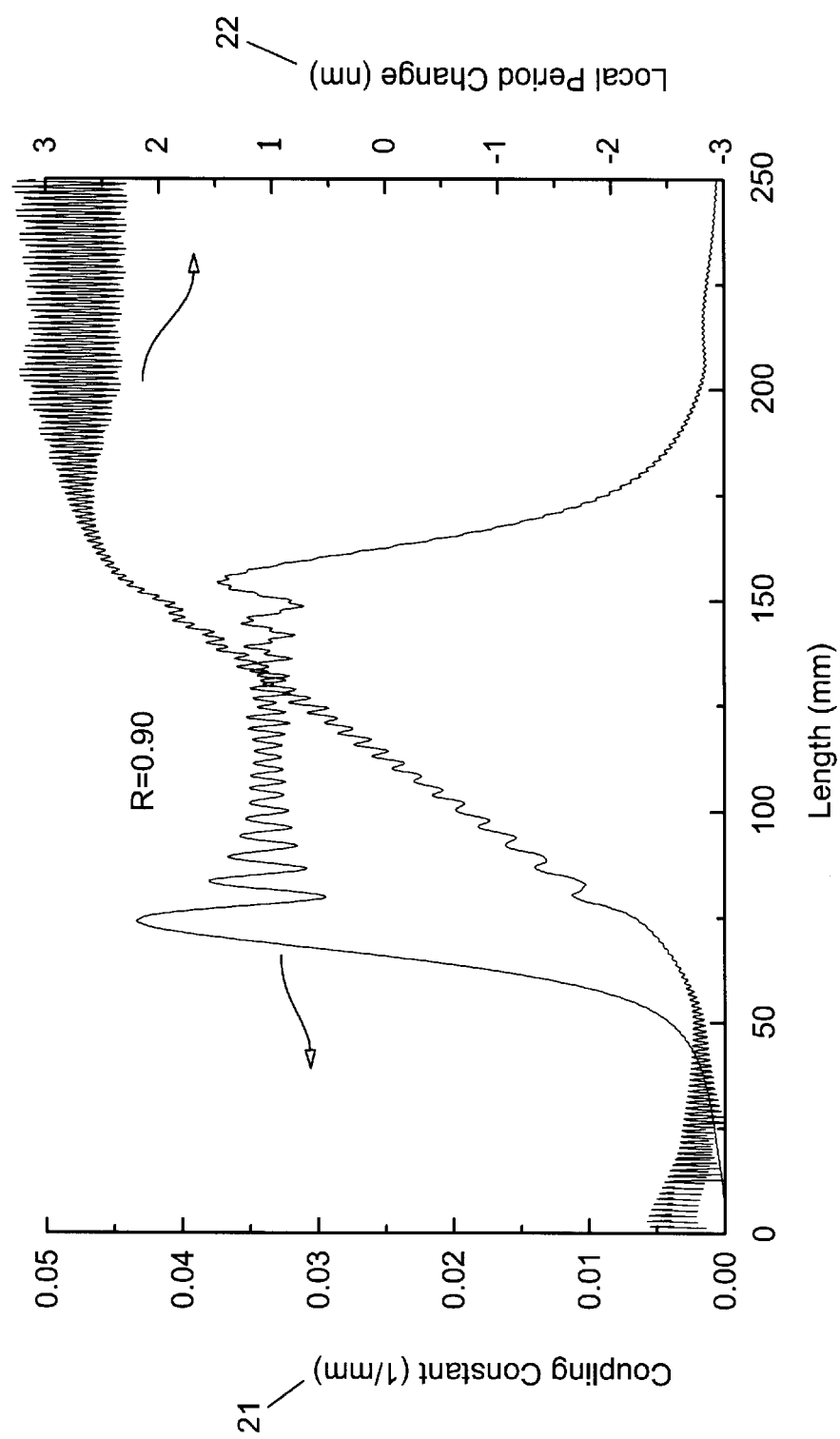
FIG. 24 is a diagram of an embodiment of the present invention depicting the line strength and relative displacement of a square dispersion compensating filter with 90% reflectivity.
Figure 25:
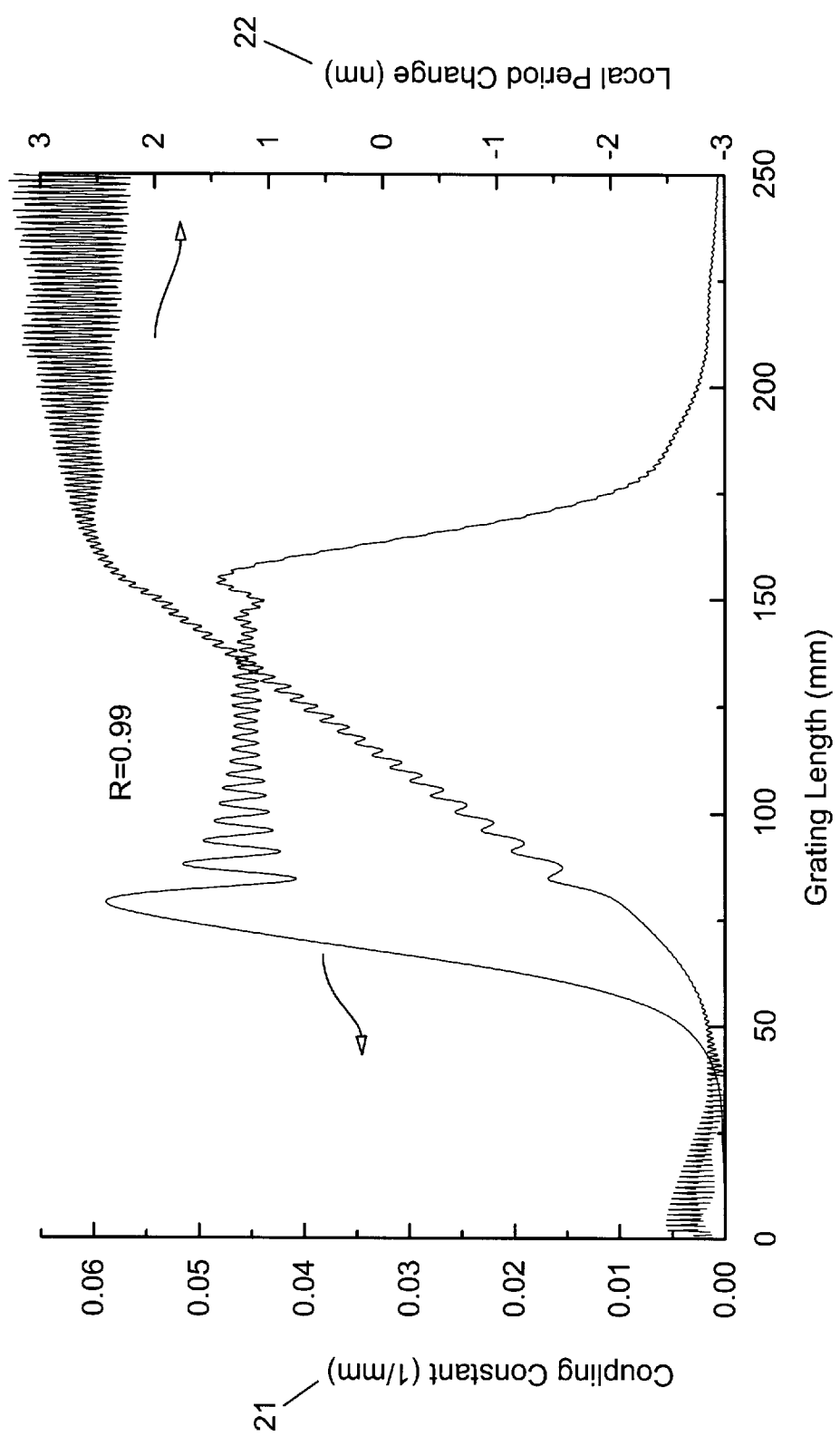
FIG. 25 is a diagram of an embodiment of the present invention depicting the line strength and relative displacement of a square dispersion compensating filter with 99% reflectivity.
Figure 26:
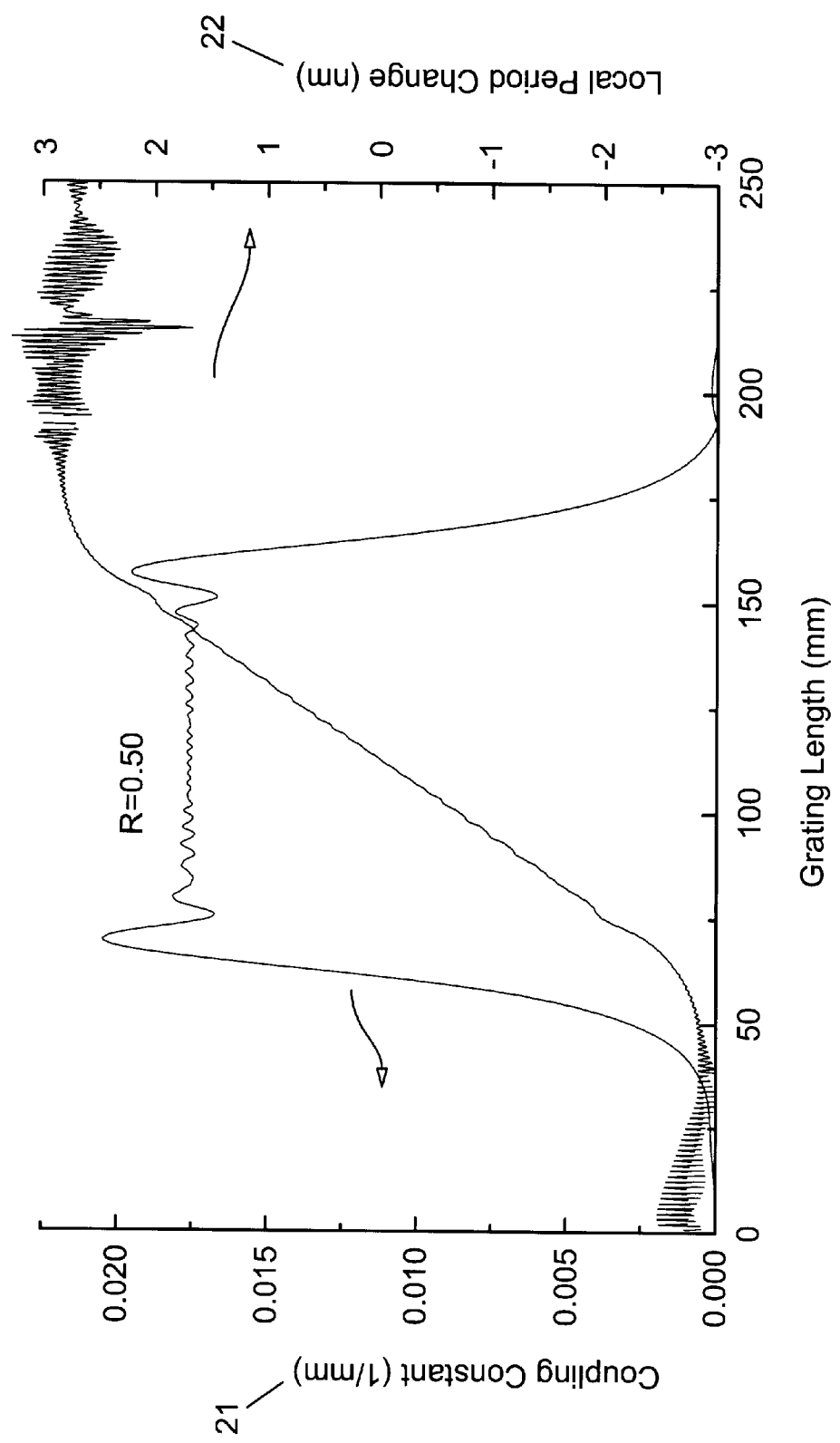
FIG. 26 is a diagram of an embodiment of the present invention depicting the line strength and relative displacement of a square dispersion compensating filter with 50% reflectivity.
Figure 27:
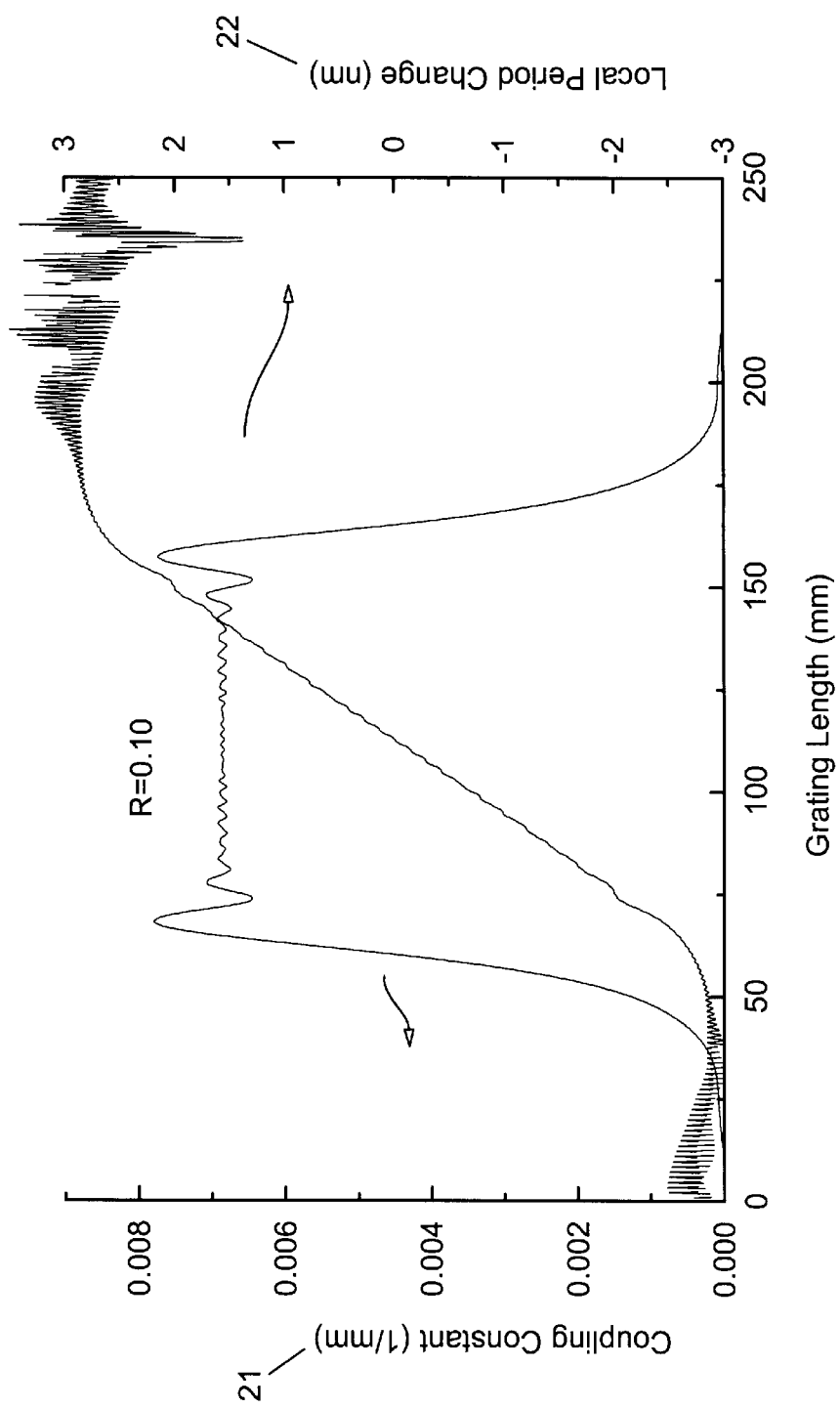
FIG. 27 is a diagram of an embodiment of the present invention depicting the line strength and relative displacement of a square dispersion compensating filter with 10% reflectivity.

The amplitude A3 can be in the range 0.1% to 99.999999%. The resulting coupling function 50 will in general be complex. FIG. 24 shows the resulting relative displacement 22 and the line strength 21 for amplitudes A3 of 90%. FIG. 25 shows the resulting relative displacement 22 and the line strength 21 for amplitudes A3 of 99%. FIG. 26 shows the resulting relative displacement 22 and the line strength 21 for amplitudes A3 of 50%. FIG. 27 shows the resulting relative displacement 22 and the line strength 21 for amplitudes A3 of 10%. As the reflectivity becomes progressively smaller, the coupling function and relative displacement become smoother and closer to traditional designs that rely entirely on intuition. Our Inverse Scattering design technique enhances that intuition and extends it to any reflectivity level.

Figure 28:
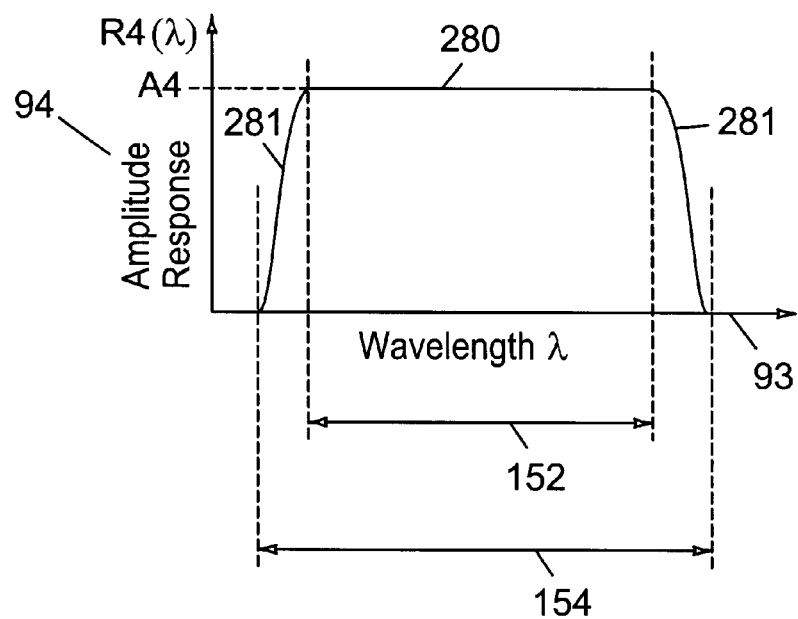
FIG. 28 is a diagram of an embodiment of the present invention depicting the amplitude response of a square dispersion compensating filter with sloping edges.
Figure 29:
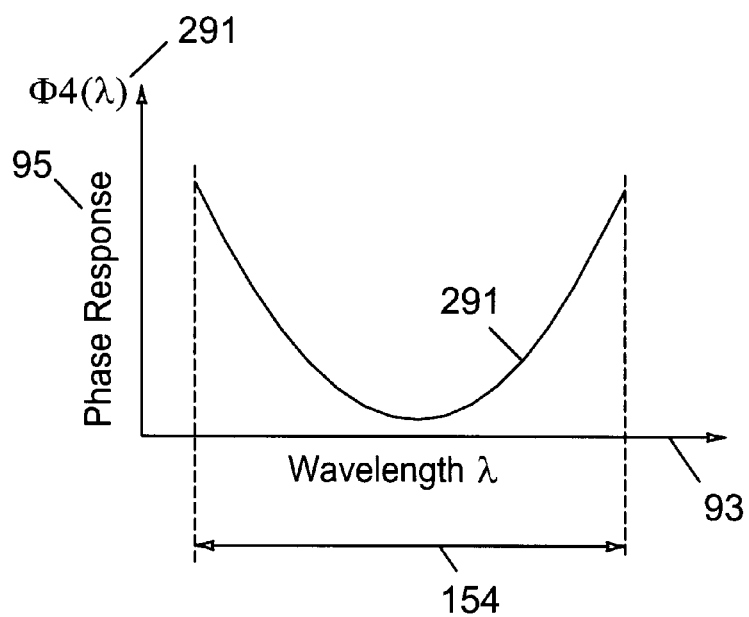
FIG. 29 is a diagram of an embodiment of the present invention depicting the phase response of a square dispersion compensating filter with sloping edges.

The amplitude response 94 can be a substantially square function $R4(\lambda)$ 280 with sloping edges 281 as shown in FIG. 28. The function $R4(\lambda)$ 280 is equal to A4 within a passband 152, and substantially equal to zero outside an outer passband 154. The inner and outer bandwidths are 0.4 nm and 0.65 nm respectively. The phase response 95 can be a substantially quadratic function $\phi4(\lambda)$ 291 as shown in FIG. 29 within the outer passband 154. This results in substantially linear time delay variation across the outer bandwidth 154. The bandwidth utilization, defined as the ratio of the passband 152 to the outer passband 154 is 61.5%. It is preferable to maximize the bandwidth utilization factor.

Figure 30:
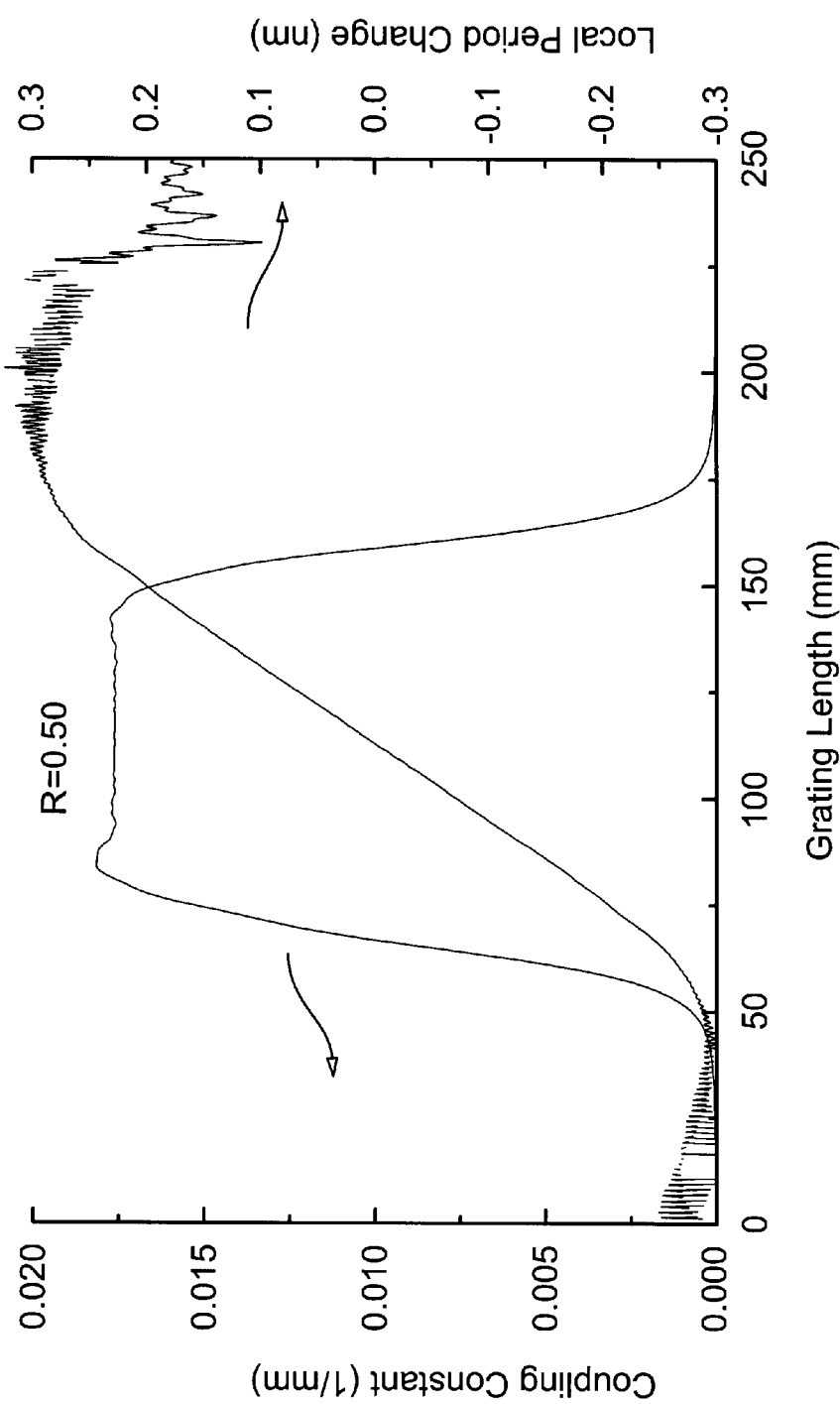
FIG. 30 is a diagram of an embodiment of the present invention depicting the line strength and relative displacement of a square dispersion compensating filter with sloping edges with 50% reflectivity.

FIG. 30 shows the resulting coupling function corresponding to the filter characteristics $R4(\lambda)$ 280 (FIG. 28) for amplitudes A4 of 50% and phase response 291 (FIG. 29), according to the present invention. It is shown that as the required reflectivity becomes smaller, the amplitude response becomes less "square" and the bandwidth utilization factor gets smaller, the coupling function and relative displacement become smoother and closer to traditional designs that rely entirely on intuition. Our Inverse Scattering design technique again enhances that intuition and extends it to any reflectivity level.

Figure 31:
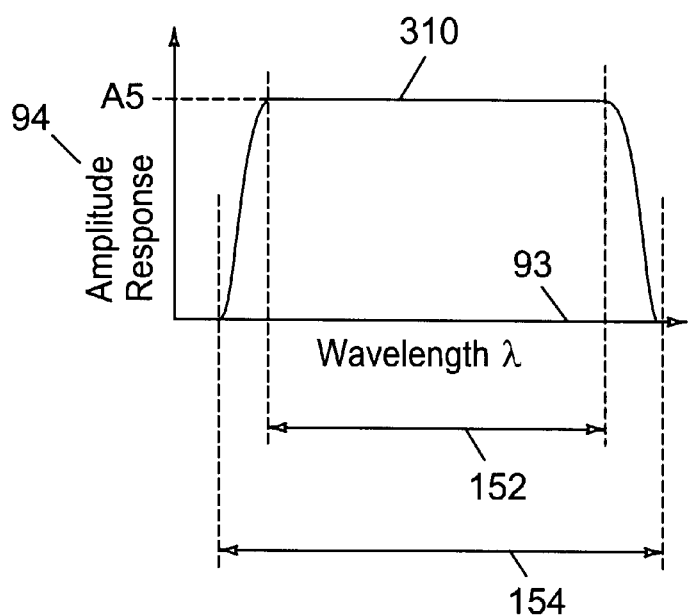
FIG. 31 is a diagram of an embodiment of the present invention depicting the amplitude response of a third order dispersion compensating filter with sloping edges.
Figure 32:
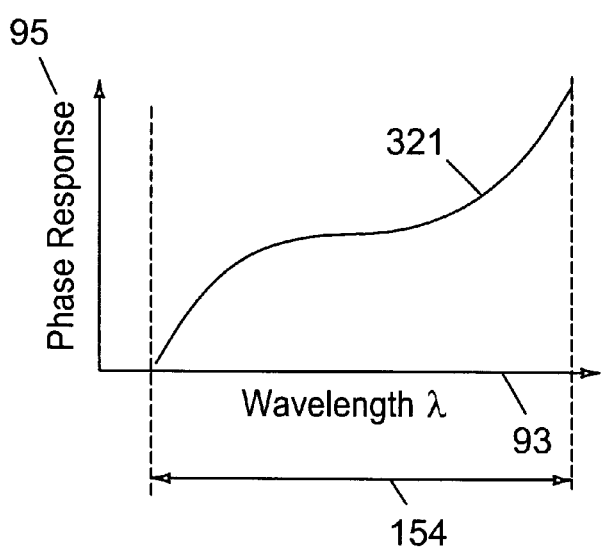
FIG. 32 is a diagram of an embodiment of the present invention depicting the phase response of a third order dispersion compensating filter with sloping edges.

The amplitude response 94 can be a substantially square function $R5(\lambda)$ 310 with sloping edges 311 as shown in FIG. 31. The function $R5(\lambda)$ 310 is equal to A5 within a passband 152, and substantially equal to zero outside an outer passband 154. The amplitude A5 can be from 0.1% to 99.999999%. The phase response 95 can be substantially cubic 321 as shown in FIG. 32 within the outer passband 154. This corresponds to a substantially quadratic time-delay response and can provide a filter only with third-order chromatic dispersion. The time delay response can also be non-linear in order to provide a filter with both second-, third- and higher-order chromatic dispersion. The slope of the dispersion characteristic can be either positive or negative.

Figure 33:
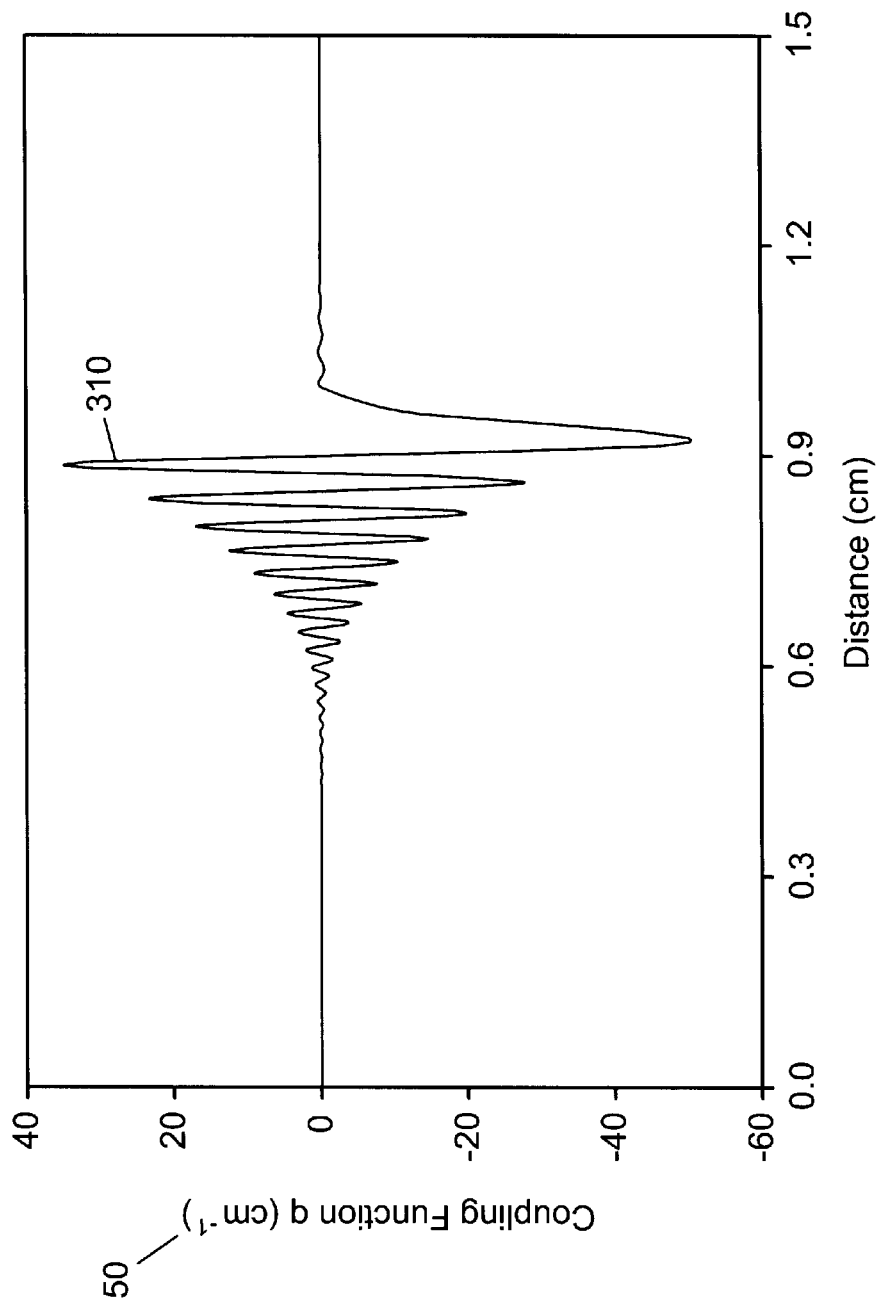
FIG. 33 is a diagram of an embodiment of the present invention depicting the line strength of a third order dispersion compensating filter with sloping edges with 90% reflectivity.

The coupling coefficient 50 generated by the present invention in order to realize the filter response $R5(\lambda)$ 310 with a quadratic dispersion is shown in FIG. 33. The coupling function in this case is a real number which implies that the grating period is fixed.

The present invention also provides a method for designing the coupling coefficient 50 of a single grating such that the filter response $R(\lambda)$ and the group delay characteristic 95 can be non-continuous, non-monotonic, and can define several passbands. The filter response of each passband can be optimized by using the present invention compared to that described in prior art, and can be derived from one or more of the embodiments described above. The relative wavelength spacing of each passband can be equal or different. The filter response of each passband can be equal or different. The phase and group delay response of each passband can be equal or different. The passband width and bandwidth utilization of each passband can be equal or different. The relative phase of the filter response of each passband can be negative, positive, or zero. The relative phase of the filter response between adjacent passbands can be equal or different; the relative phase need not increase or decrease monotonically with wavelength. The variety of designs that can be generated by the present invention demonstrates that the technique is well-suited to designing practical grating structures that have filter characteristics that well-matched to ideal filter responses for a wide variety of applications.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An optical waveguide defining a Bragg grating wherein the Bragg grating is designed using a serial iterative process, and wherein the Bragg grating is defined by a first end, and further wherein the serial iterative process is begun at the first end of the Bragg grating, and further wherein the Bragg grating comprises a plurality of lines, each line being defined by a respective strength, and each line having a relative displacement from adjacent lines, and wherein the serial iterative process is used to calculate the strength and the line spacing of at least some of the lines.

2. The optical waveguide of claim 1, and wherein the Bragg grating is defined by a first end and a second end, and wherein the strength and the relative displacement of the lines are determined using the serial iterative process starting from the first end and continuing through to the second end.

3. The optical waveguide of claim 1, and wherein the Bragg grating is defined by a coupling function, and further wherein the serial iterative process is a function of the coupling function.

4. The optical waveguide of claim 1, and wherein when light is propagated within the waveguide, it is defined by a group velocity, and further wherein the serial iterative process is a function of the group velocity.

5. The optical waveguide of claim 4, and wherein the Bragg grating comprises a plurality of lines, and further wherein a portion of the Bragg grating defines a first length z0 containing at least a first line of the Bragg grating, and a first time t0 corresponding to the length z0, and a second line of the Bragg grating is associated with a length increment δz having a corresponding time increment δt, and wherein the length increment δz is calculated as a function of the time increment δt and the group velocity.

6. The optical waveguide of claim 5, and wherein each line of the grating is defined by a respective strength, and each line has a relative displacement from adjacent lines, and wherein the relative strength and the relative displacement of the lines defines a coupling function, and further wherein subsequent line spacing is serially iteratively calculated by successively stepping the first length z0 from a first end of the Bragg grating by calculating an impulse response for the first length z0, and then comparing the impulse response to a desired impulse response, and then using the difference to determine the coupling function, and then using the coupling function to determine the next line spacing and strength.

7. The optical waveguide of claim 6, and wherein the coupling function is characterized by a coupling function coefficient, and further wherein the coupling function coefficient is iteratively calculated by successively incrementing the first length z0 from the first end by length a increment δz and calculating the coupling function coefficient of each grating increment.

8. The optical waveguide of claim 1, and wherein the Bragg grating is defined by a reflectivity, and further wherein the serial iterative process is a function of the reflectivity.

9. The optical waveguide of claim 1, and wherein the Bragg grating is defined by a dispersion response, and further wherein the iterative process is a function of the dispersion response.

10. The optical waveguide of claim 1, and wherein the Bragg grating produces a selected impulse response, and further wherein the Bragg grating is defined by a subgrating configured to produce a second impulse response, and the iterative process is selected to result in the selected impulse response and is a function of the second impulse response.

11. An optical waveguide defining a Bragg grating having a first end and a second end, and wherein the Bragg grating is defined by:
   a selected grating reflectivity and dispersion response which varies with a wavelength;
   a selected impulse response hR that varies with a time t;
   a coupling function that varies with a length z that is measured from the first end;
   a first length z0 with a corresponding first time t0;
   a length increment δz with a corresponding time increment δt;
   a subgrating that extends from the first end to the first length z0;
   a second impulse response hT of the subgrating that varies with a time t;
   a group velocity of light propagating in the optical waveguide; and
   wherein:
      the first length z0 is equal to the first time t0 multiplied by the group velocity divided by 2;
      the length increment δz is equal to the time increment δt multiplied by the group velocity divided by 2;
      the selected impulse response and the selected grating reflectivity and dispersion response are Fourier Transform pairs; and
      the coupling function at the length z0 plus δz is substantially equal to minus two times the difference between the selected impulse response hR at the time t0 plus δt and the second impulse response hT at the time t0 plus δt,
      the Bragg grating being of such a design that z0 can be successively stepped from the first end to the second end resulting in an actual impulse response that is substantially equal to the selected impulse response.

12. The optical waveguide of claim 1, and wherein the Bragg grating is characterized by a series of diminishing reflective signals, and wherein the iterative process comprises applying a time window function having an overall width T, and a time delay, and the window function is shifted by the time delay to limit the number of reflective signals considered in the iterative process.

13. The optical waveguide of claim 12, and wherein the Bragg grating is characterized by a desired impulse response hR, and wherein in the iterative process the desired impulse response hR is multiplied by the time window function to determine the distance between a first line of the Bragg grating and a second line of the Bragg grating.

14. The optical waveguide of claim 12, and wherein the time window function is chosen to contain a substantial amount of the selected impulse response hR.

15. The optical waveguide of claim 12, and wherein the time window function is chosen to contain approximately 99.9% of the selected impulse response hR.

16. The optical waveguide of claim 12, and wherein the time window function is chosen to contain approximately 99% of the selected impulse response hR.

17. The optical waveguide of claim 12, and wherein the time window function is chosen to contain greater than 95% of the selected impulse response hR.

18. The optical waveguide of claim 12, and wherein the time delay is substantially equal to half the overall width T.

19. The optical waveguide of claim 12, and wherein the time delay is less than half the overall width T.

20. The optical waveguide of claim 1, and wherein the Bragg grating characterizes a selected grating wavelength response, and wherein the selected grating wavelength response is selected from the group consisting of:
   a substantially square dispersionless filter;
   a substantially square dispersion compensator;
   a substantially square second-order dispersion compensator;
   a substantially square third-order dispersion compensator;
   a filter having multiple wavelength peaks;
   a filter having multiple wavelength peaks that are substantially square;
   a filter having multiple wavelength peaks that are substantially square and have substantially the same peak reflectivity; and
   a filter having multiple wavelength peaks that are substantially square and are defined by a peak reflectivity, and wherein the multiple wavelength peaks have substantially the same peak reflectivity and further have a reduced peak coupling ratio requirement.

21. An optical fiber defining a Bragg grating having a first end and a second end, and wherein the Bragg grating is defined by:
   a selected grating wavelength response;
   a coupling function that varies with a length z0;
   a selected impulse response that varies with a time t0; and
   a group velocity of light within the optical fiber; and
   wherein:
      z0 is a function of to and the group velocity; and
      the coupling function at the length z0 is substantially equal to the selected impulse response at the time t0 minus the impulse response of the grating from the first end of the grating to the length z0.

22. An optical fiber filter, the filter comprising a Bragg grating defined by a grating response and an impulse response, and wherein the filter is defined by a filter response which is a predetermined function of the grating response, and further wherein the grating response is selected to be a function of the impulse response at a time t0 and at a length z0 along the Bragg grating.

23. A method for fabricating a Bragg grating on an optical fiber, the Bragg grating having a selected grating response, the method comprising:

providing an optical fiber;

defining a starting point for the Bragg grating to be fabricated on the optical fiber;

etching a first line on the optical fiber;

moving a distance z0 along the optical fiber to define a subgrating length;

etching a second line on the optical fiber at the distance z0;

calculating a response for the subgrating; and using the response for the subgrating to determine the line spacing for the next line in the grating.

* * * * *